(12) United States Patent
Tanaka et al.

(10) Patent No.: US 7,911,925 B2
(45) Date of Patent: Mar. 22, 2011

(54) OPTICAL PICKUP

(75) Inventors: Toshiyasu Tanaka, Osaka (JP); Yoshiaki Komma, Osaka (JP)

(73) Assignee: Panasonic Corporation, Osaka (JP)

( * ) Notice: Subject to any disclaimer, the term of this patent is extended or adjusted under 35 U.S.C. 154(b) by 475 days.

(21) Appl. No.: 12/065,836

(22) PCT Filed: Sep. 7, 2006

(86) PCT No.: PCT/JP2006/317755
§ 371 (c)(1), (2), (4) Date: Mar. 5, 2008

(87) PCT Pub. No.: WO2007/029776
PCT Pub. Date: Mar. 15, 2007

(65) Prior Publication Data
US 2009/0141614 A1    Jun. 4, 2009

(30) Foreign Application Priority Data
Sep. 7, 2005   (JP) .................................. 2005-259212

(51) Int. Cl.
*G11B 7/00* (2006.01)
(52) U.S. Cl. ................................. 369/112.28
(58) Field of Classification Search .................. None
See application file for complete search history.

(56) References Cited

U.S. PATENT DOCUMENTS

| | | |
|---|---|---|
| 2002/0071377 A1 | 6/2002 | Ogata |
| 2003/0128439 A1 | 7/2003 | Ori |
| 2004/0145997 A1 | 7/2004 | Yasuda et al. |
| 2004/0264344 A1 | 12/2004 | Ogata |
| 2005/0237639 A1 | 10/2005 | Tanaka et al. |
| 2006/0120251 A1 * | 6/2006 | Sakamoto et al. ............ 369/122 |

FOREIGN PATENT DOCUMENTS

| | | |
|---|---|---|
| JP | 2000-292738 | 10/2000 |
| JP | 2002-123960 | 4/2002 |
| JP | 2003-178480 | 6/2003 |
| JP | 2003-188452 | 7/2003 |
| JP | 2004-247032 | 9/2004 |
| JP | 2005-49550 | 2/2005 |
| JP | 2005-338805 | 12/2005 |
| JP | 2006-54003 | 2/2006 |
| WO | 2005/020220 | 3/2005 |
| WO | WO 2005020220 A1 * | 3/2005 |

OTHER PUBLICATIONS

International Search Report issued Oct. 3, 2006 in the International (PCT) Application No. PCT/JP2006/317755.

* cited by examiner

*Primary Examiner* — Joseph Haley
(74) *Attorney, Agent, or Firm* — Wenderoth, Lind & Ponack, L.L.P.

(57) ABSTRACT

An adhesive positions a beam shaping element in such a manner as to satisfy the following relational expressions (1) and (2):

$$0 < L \leq \Delta WA/(\alpha \cdot \Delta \cdot S_{AS}) \quad (1)$$

$$S_{AS} = 1000(0.5\ m^2 + 1.5m - 2)[m\lambda/mm] \quad (2),$$

if it is assumed that m is the beam shaping magnification of a beam shaping element, L[mm] is the distance from a light source side surface of the beam shaping element to a center position of the adhesive, $\alpha[1/K]$ is the linear expansion coefficient of a light source retaining holder, $\Delta WA[m\lambda]$ is amount of astigmatic aberration caused by the beam shaping element, and $\Delta T[K]$ is an environmental temperature variation amount.

12 Claims, 21 Drawing Sheets

FIG.3

| m | SAS[mλ/um] | EFFICIENCY [%] | EFFICIENCY RATIO | LDPw RATIO |
|---|---|---|---|---|
| 1 | 0 | | | |
| 1.3 | 0.7 | 17 | 60.7% | 1.65 |
| 1.5 | 1.3 | 20 | 71.4% | 1.40 |
| 1.9 | 2.5 | 24 | 85.7% | 1.17 |
| 2.1 | 3.2 | 26 | 92.9% | 1.08 |
| 2.2 | 3.5 | 27 | 96.4% | 1.04 |
| 2.3 | 4 | 28 | 100.0% | 1.00 |
| 2.5 | 5 | 30 | 107.1% | 0.93 |
| 3 | 7 | | | |
| 4 | 12 | | | |
| 5 | 18 | | | |
| 5.8 | 23.5 | | | |

FIG.5 m=2.2

| | | | | | |
|---|---|---|---|---|---|
| DISTANCE BETWEEN EMISSION POINT AND END SURFACE | 1.0 | 1.2 | 1.4 | 1.6 | 2.0 [mm] |
| DISTANCE BETWEEN EMISSION POINT AND FIXED POINT | 2.0 | 2.2 | 2.4 | 2.6 | 3.0 [mm] |
| $\Delta$WA | 9.45 | 10.40 | 11.34 | 12.29 | 14.18 [m$\lambda$] |

FIG.6 m=2.3

| | 1.0 | 1.2 | 1.4 | 1.6 | 2.0 | [mm] |
|---|---|---|---|---|---|---|
| DISTANCE BETWEEN EMISSION POINT AND END SURFACE | | | | | | |
| DISTANCE BETWEEN EMISSION POINT AND FIXED POINT | 2.0 | 2.2 | 2.4 | 2.6 | 3.0 | [mm] |
| ΔWA | 10.80 | 11.88 | 12.96 | 14.04 | 16.20 | [mλ] |

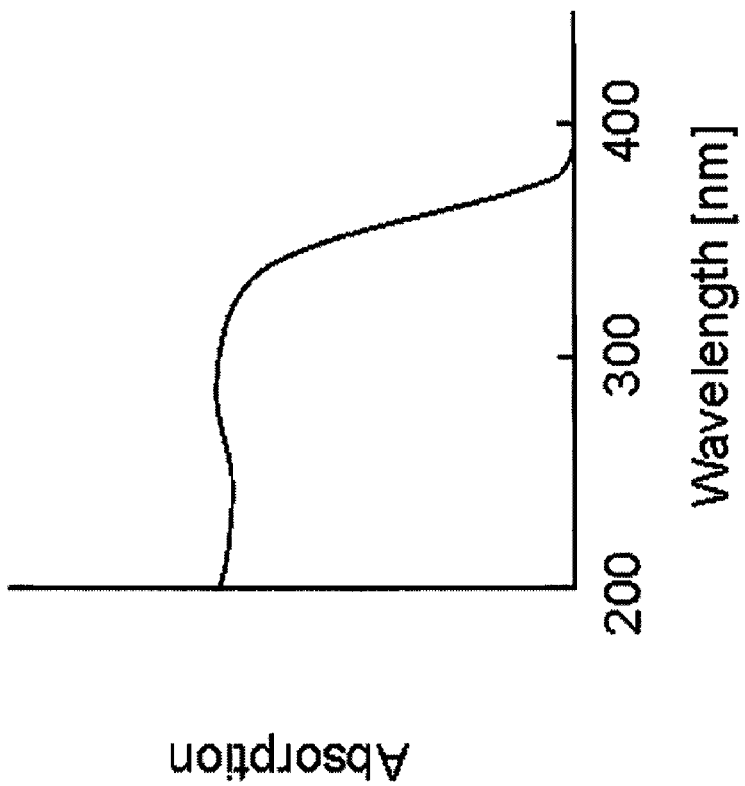
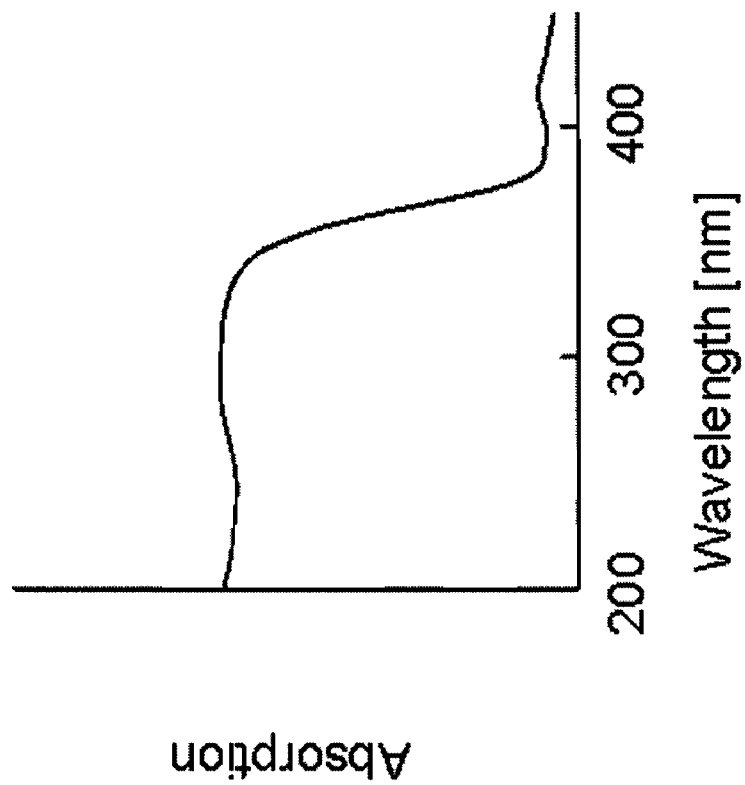

OPTICAL PICKUP

FIELD OF THE INVENTION

The present invention relates to an optical pickup for irradiating an optical information recording medium with light and detecting a reflected light.

BACKGROUND ART

There are a wide variety of recording media for recording and saving digital audios, images, moving images and document files and data files generated by computers. This variety includes optical discs. Above all, DVDs (Digital Versatile Disks) have higher densities and higher capacities than conventional CDs (Compact Discs) and have spread as media replacing presently prevailing VTR (Video Tap Recorders) also in the field of recording apparatuses. Further, in recent years, researches on next-generation optical discs with higher recording densities using blue-violet semiconductor lasers have been made in laboratories. Early appearance and prevalence are waited for. An optical pickup is necessary to record or reproduce data on or from these optical discs.

An optical pickup for recording or reproducing information on or from an optical disc generally includes a light source, an objective lens for condensing a beam emitted from the light source on the optical disc, and a detector for detecting the beam reflected by the optical disc. Since a semiconductor laser as the light source emits a beam from an end surface of its thin active layer, the beam has an elliptical shape and a ratio of a minor axis to a major axis of this elliptical shape is about 1:3. Upon recording information on the optical disc, it is desirable to shape the elliptical beam into a circular beam in the light of improving light utilization efficiency.

An anamorphic prism or an anamorphic lens is generally used as such an element for shaping the beam. Since the anamorphic prism needs to be used in a parallel beam, it hinders the miniaturization of the optical pickup. Accordingly, by using the anamorphic lens capable of shaping a divergent beam, a small-size optical pickup with high light utilization efficiency can be realized.

Other elements actually constituting the optical pickup include a reflective optical element and an objective lens. These elements are generally likely to have astigmatism as an initial property. A beam shaping element formed of an anamorphic lens has a property of giving astigmatism due to the deviation of a distance from an emission point from a designed value. The optical pickup can conversely correct the astigmatisms of the reflective optical element and the objective lens utilizing this property. By having such a construction, a spot formed on the optical disc by a beam emitted from the objective lens of the optical pickup can have a better quality.

FIG. 21 show one prior art of a retaining structure for a beam shaping element. This prior art is disclosed, for example, in patent literature 1 below. In this prior art, an occurrence of astigmatism resulting from a refractive index change can be suppressed by equalizing a distance "s" from an emission point to a first surface S1 of a beam shaping element L and a thickness "t" of the beam shaping element L, and an occurrence of astigmatism resulting from an environmental temperature change can be suppressed by equalizing a linear expansion coefficient $\alpha L$ of the beam shaping element L and a linear expansion coefficient $\alpha H$ of a retainer H.

Patent Literature 1:

Japanese Unexamined Patent Publication No. 2003-178480

However, the construction shown in the prior art considers the astigmatisms that occur due to a distance change between the beam shaping element and the emission point by an environmental temperature change and the like. Thus, it is only designed to reduce astigmatism adjustable sensitivity between the emission point and the beam shaping element. Further, a LD (Laser Diode) as a light source element having the emission point is generally covered by metal and the like. Specifically, if the beam shaping element designed as shown in the prior art is used, a moving distance increases due to a low adjustable sensitivity in the case where the distance between the emission point and the beam shaping element is changed to correct the astigmatisms of the reflective optical element and the objective lens. Thus, there are cases where the beam shaping element and the cover of the LD touch each other, which presents a problem that the astigmatism of the spot formed on the optical disc by the beam emitted from the objective lens cannot be perfectly corrected.

In the prior art, only the retaining structure for the light source element and the beam shaping element is described, but a method for actually fixing the beam shaping element is not described. Even if the construction shown in the prior art is adopted, there is a problem that astigmatisms higher than those calculated in relation to a temperature change occur depending on a fixed position by an adhesive if the adhesive is, for example, used to fix the beam shaping element.

DISCLOSURE OF THE INVENTION

It is an object of the present invention to solve the above problems and to provide a retaining/fixing structure for sufficiently suppressing an astigmatism amount in relation to a temperature change while considering a proper movement range capable of correcting astigmatisms of other optical pickup constituent parts such as an objective lens by adjusting a distance between an emission point and a beam shaping element.

In order to solve the above problem, the present invention is directed to an optical pickup, comprising a light source; a beam shaping element for shaping an elliptical light beam emitted from the light beam into a substantially circular light beam; an element for condensing the light beam shaped by the beam shaping element onto an optical information recording medium; a detector for detecting the light beam reflected by the optical information recording medium; a positioning portion for positioning the beam shaping element relative to the light source, wherein if it is assumed that m is a beam shaping magnification of the beam shaping element, L[mm] is a distance from a light source side surface of the beam shaping element to a center position of the positioning portion, $\alpha[1/K]$ is a linear expansion coefficient of the retaining holder, $\Delta WA$ [m$\lambda$] is amount of astigmatic aberration caused by the beam shaping element and $\Delta T[K]$ is an environmental temperature variation amount, the positioning portion positions the beam shaping element in such a manner as to satisfy the following relational expressions (1) and (2):

$$0 < L \leq \Delta WA / (\alpha \cdot \Delta T \cdot S_{AS}) \quad (1)$$

$$S_{AS} = 1000(0.5 \text{ m}^2 + 1.5 \text{ m} - 2)[\text{m}\lambda/\text{mm}] \quad (2).$$

BRIEF DESCRIPTION OF THE DRAWINGS

FIG. 3 is a table showing values of astigmatism, efficiency, efficiency ratio and LDPw ratio in relation to beam shaping magnification, FIG. 5 is a table showing values of the astigmatism in the case where the beam shaping magnification is 2.2, FIG. 6 is a table showing values of the astigmatism in the case where the beam shaping magnification is 2.3, FIG. 8A is a characteristic graph showing a property of a general ultraviolet curable resin and FIG. 8B is a characteristic graph showing a property of an ultraviolet curable resin used in an adhesive in a third embodiment of the invention.

BEST MODES FOR EMBODYING THE INVENTION

Hereinafter, best modes for embodying the present invention are described in detail with reference to the accompanying drawings.

First Embodiment

Figure 1A:
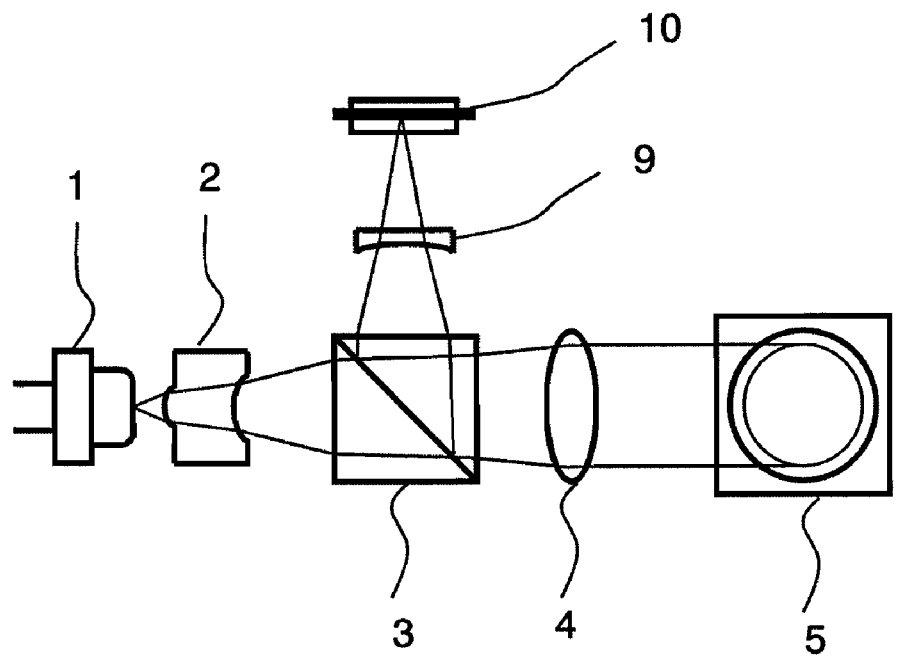
FIGS. 1A and 1B are diagrams schematically showing the construction of an optical pickup according to a first embodiment of the invention.
Figure 1B:
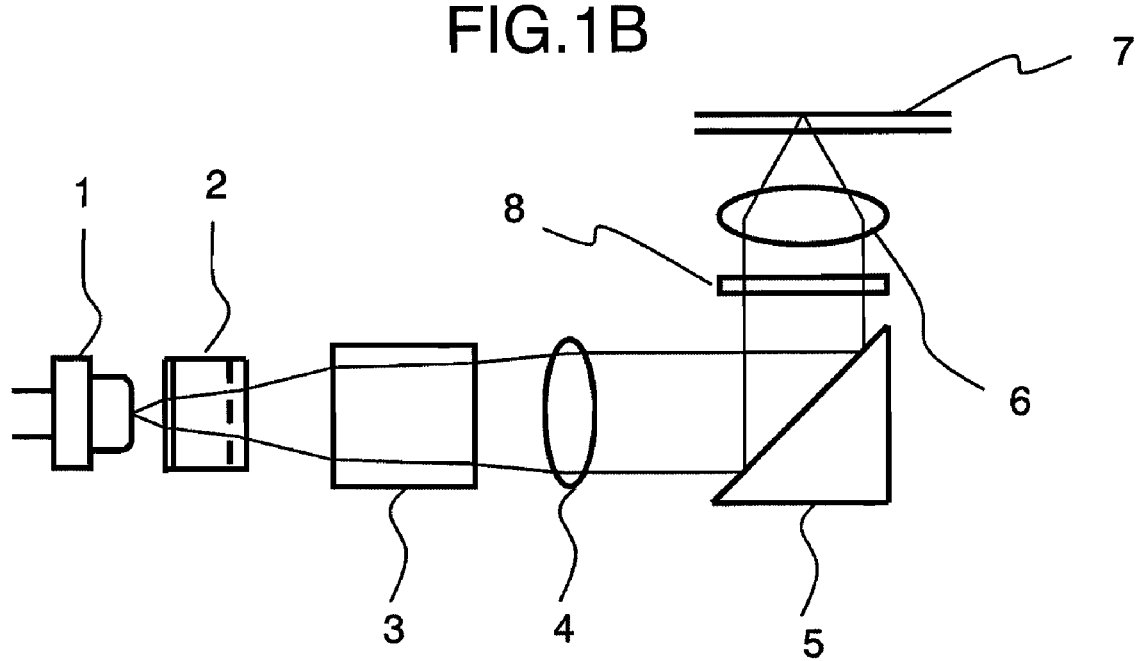

FIGS. 1A and 1B schematically show one embodiment of an optical pickup according to the present invention. In FIGS. 1A and 1B, identified by 1 is a laser light source for emitting a laser light having a wavelength λ, by 2 a beam shaping element for shaping the laser light, by 3 a beam splitter for splitting an optical path, by 4 a collimator lens, by 5 a bending mirror for bending an optical axis, by 6 an objective lens (optical lens) and by 7 an optical disc as an example of a light information recording medium. The wavelength λ of the light beam emitted from the laser light source 1 is, for example, 390 nm to 420 nm. Here, 405 nm is set as a representative value. The light beam is not limited to those in such a wavelength range and may have, for example, about 660 nm.

The beam shaping element 2 shapes an elliptical light beam emitted from the laser light source 1 into a substantially circular beam. The beam splitter 3 transmits the light beam having passed through the beam shaping element 2 while reflecting a reflected light from the optical disc 7. The collimator lens 4 converts a divergent light having passed through the beam shaping element 2 into a parallel light. The objective lens 6 is means for condensing the light beam onto the optical disc 7.

The optical disc 7 has a thickness t1 of a substrate that is equal to or smaller than 0.1 mm. Recording and reproduction are performed by irradiating the optical disc 7 with the light beam having a wavelength λ. In FIG. 1B, only the substrate of the optical disc 7 from a light incidence surface to a recording surface is shown. In the optical disc 7, a protection plate is actually bonded to reinforce mechanical strength and to have the same thickness of 1.2 mm as CDs, but the protection material is not shown for simplicity.

The laser light source 1 is preferably a semiconductor laser light source. Thus, the optical pickup and an optical information apparatus using this optical pickup can be miniaturized and reduced in its weight and power consumption.

Upon the recording or reproduction on or from the optical disc 7, a blue light beam having a wavelength λ and emitted from the laser light source 1 is shaped by the beam shaping element 2. This light beam substantially entirely passes through the beam splitter 3, is converted into a substantially parallel light by the collimator lens 4, has the optical axis thereof bent by the bending mirror 5 and is converted into a circularly polarized light by a quarter-wave plate 8. This circularly polarized light is condensed on an information recording surface of the optical disc 7 through the substrate having a thickness of 0.1 mm by the refractive objective lens 6.

The blue light beam reflected by the information recording surface tracks back the original optical path (return journey). This light beam is converted into a linearly polarized light of a direction perpendicular to an initial direction by the quarter-wave plate 8, has the focal length thereof extended by the collimator lens 4, is substantially fully reflected by the beam splitter 3 and passes through a detection lens 9 to be incident on a photodetector 10. By calculating an output of the photodetector 10, a servo signal used for a focus control and a tracking control and an information signal are obtained. As described above, the beam splitter 3 is an optical path splitting element with a polarization separation film for fully reflecting a linearly polarized light of one direction and fully transmitting a linearly polarized light of a direction perpendicular to the one direction.

Figure 2:
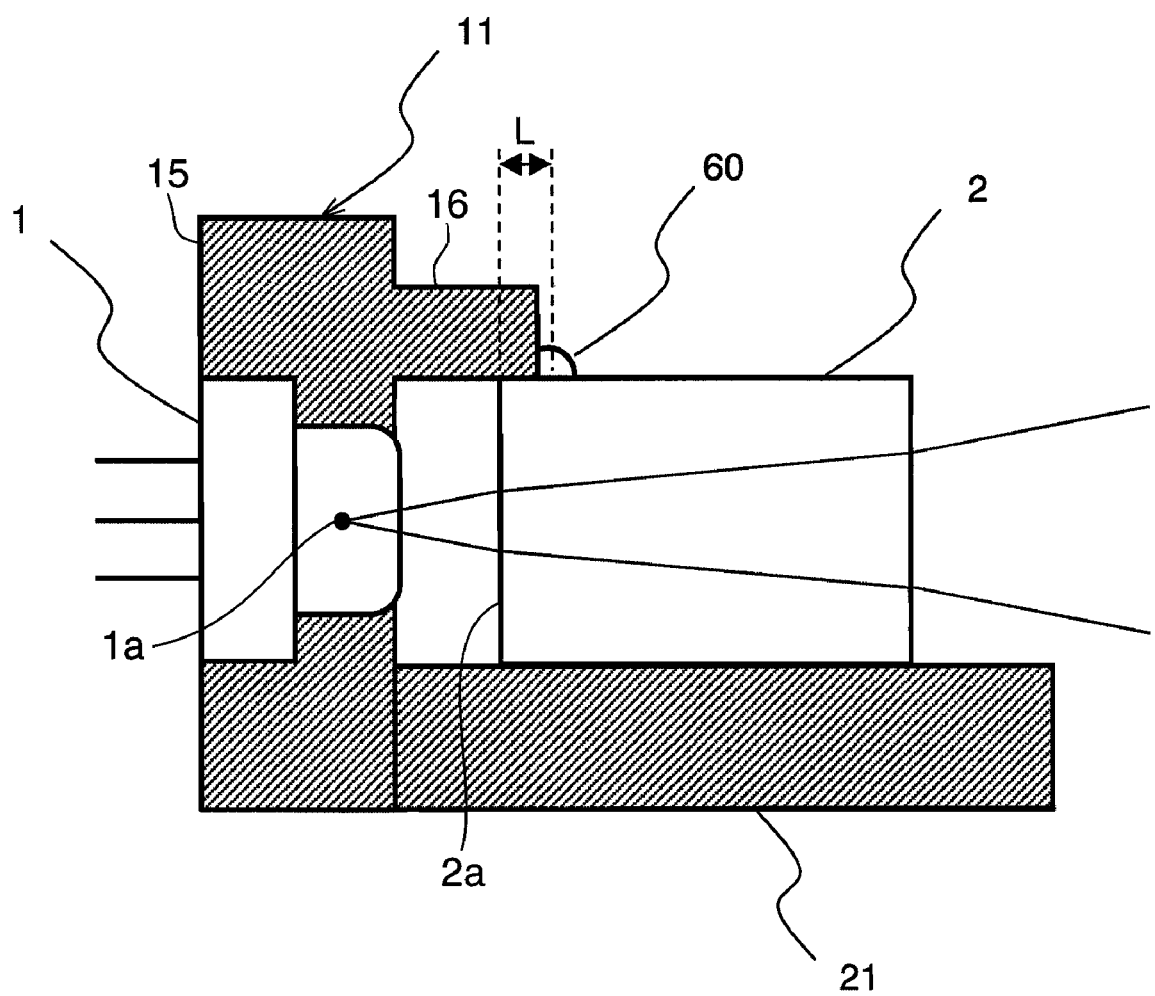
FIG. 2 is a diagram enlargedly showing the construction of a light source section and its vicinity of the optical pickup.

Here, the structure of the light source section of the first embodiment is shown in FIG. 2. In FIG. 2, identified by 11 is a light source retaining holder as a light source element retainer, by 21 a beam shaping element retaining holder (element retaining holder) as a beam shaping element retainer, and by 60 an adhesive for fixing the beam shaping element 2 to the element retaining holder 21. The light source retaining holder 11 includes a holder main body 15 as a retainer main body for holding the laser light source 1 and an extending portion 16 extending from the holder main body 15 in an optical axis direction of the light beam. The laser light source 1 is retained by the holder main body 15 by being embedded in the holder main body 15. The extending portion 16 is formed to be integral to a beam emergent surface (right surface in FIG. 2) of the holder main body 15.

The element retaining holder 21 is arranged in parallel to the extending portion 16 in a posture extending in the optical axis direction, and is bonded to the beam emergent surface of the holder main body 15 by an adhesive. The beam shaping element 2 is arranged such that an end thereof toward the light source is located between the element retaining holder 21 and the extending portion 16. A small mass of the adhesive 60 is placed between the outer circumferential surface of the beam shaping element 2 and the leading end surface of the extending portion 16 to bond the both. This adhesive 60 is a member for positioning the beam shaping element 2 relative to the laser light source 1 and is an example of a positioning portion.

In the first embodiment, the beam shaping element 2 is placed on the element retaining holder 21 and the extending portion 16 is positioned above the beam shaping element 2. There is a small clearance between the beam shaping element 2 and the extending portion 16. This is for enabling the position of the beam shaping element 2 to be adjusted before the adhesive 60 is cured.

The beam shaping element 2 is made of a glass or a light resistant resin.

Here, the adhesion position of the adhesive 60 functioning as the positioning portion for the beam shaping element 2 is described. The adhesive 60 is specified such that a center position thereof is at a specified distance from a light source side surface 2a of the beam shaping element 2. Specifically, if it is assumed that m is the beam shaping magnification of the beam shaping element 2, L[mm] is the distance from the light source side surface 2a of the beam shaping element 2 to the center position of the adhesive 60, $\alpha$[1/K] is the coefficient of linear expansion of the light source retaining holder 11, $\Delta$WA [m$\lambda$] is amount of astigmatic aberration caused by the beam shaping element 2 and $\Delta$T[K] is an environmental temperature variation amount, the adhesive 60 positions the beam shaping element 2 in such a manner as to satisfy the following relational expressions (1) and (2):

$$0 < L \leq \Delta WA / (\alpha \cdot \Delta T \cdot S_{AS}) \quad (1)$$

$$S_{AS} = 1000(0.5\ m^2 + 1.5\ m - 2)[m\lambda/mm] \quad (2)$$

The center position of the adhesive 60 is a fixed point where the position of the beam shaping element 2 is fixed relative to the extending portion 16 of the light source retaining holder 11.

Since the extending portion 16 thermally expands and contracts according to an environmental temperature change, the position of the beam shaping element 2 accordingly changes to cause the amount of astigmatic aberration $\Delta$WA. This amount of astigmatic aberration $\Delta$WA can be expressed by relational expression (3):

$$\Delta WA = \alpha \cdot L \cdot \Delta T \cdot S_{AS} \quad (3).$$

Here, $S_{AS}$ is an astigmatism amount in relation to a variation amount of the distance between an emission point 1a and the beam shaping element 2. The above relational expression (1) can be obtained from this relational expression (3).

Next, the relational expression (2) is described. The relational expression (2) is obtained by studying the astigmatism amount when the arrangement position of the beam shaping element 2 is changed to various positions in relation to various beam shaping magnifications m for the beam shaping elements 2 having thicknesses of 2 mm and 5 mm. The above thicknesses mean those on the optical axes of the beam shaping elements 2. The beam shaping magnification m of each beam shaping element 2 was changed to 1, 1.3, 1.5, 1.9, 2.1, 2.2, 2.3, 2.5, 3, 4, 5 and 5.8 and the distance from the emission point 1a of the laser light source 1 to the light source side surface 2a of each beam shaping element 2 was changed to 1.4 mm, 1.6 mm, 2.0 mm, 3.0 mm and 5.0 mm. The RIM intensity of a light beam upon calculating astigmatism was about 60%. The RIM intensity is a ratio of an intensity at an end of a lens pupil to a maximum intensity of light in an emergent light from the lens. A laser light source having general emission angles was used as the laser light source 1. For example, a laser light source having an emission angle of 8° in a direction parallel to an active layer thereof and an emission angle of 20° in a direction normal to the active layer was used.

Figure 4:
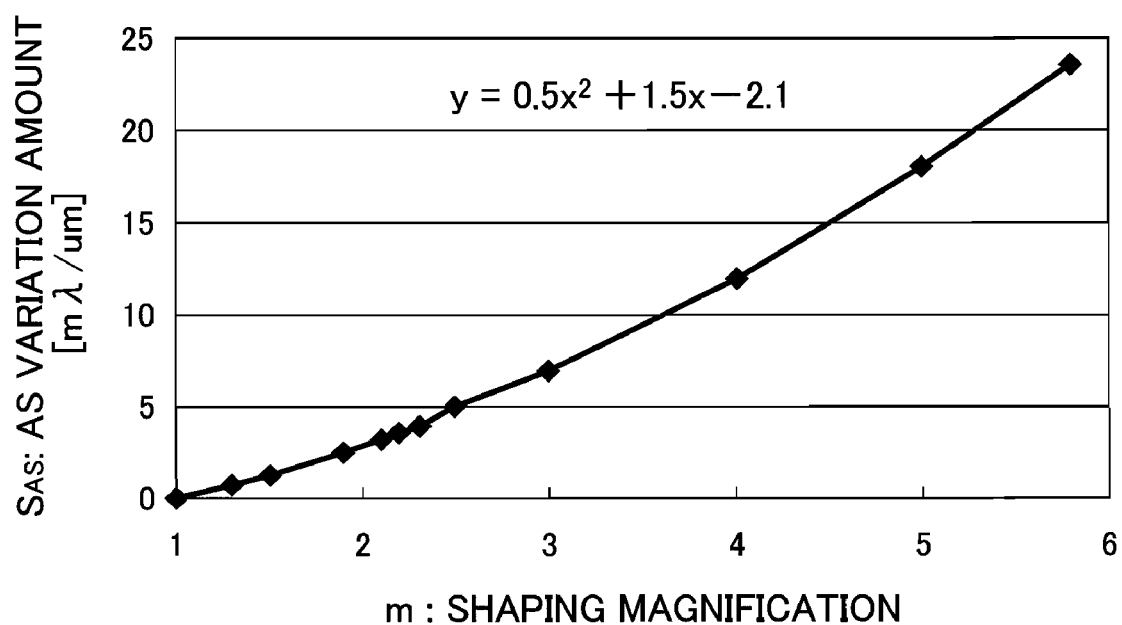
FIG. 4 is a characteristic graph showing a relationship between the beam shaping magnification and the astigmatism.

The astigmatism amounts $S_{AS}$ per unit variation amount obtained by changing the conditions to various values as described above are shown in FIGS. 3 and 4. As shown in FIGS. 3 and 4, the following relationship holds between the shaping magnification m and the astigmatism amount $S_{AS}$:

$$S_{AS} = 0.5\ m^2 + 1.5\ m - 2.1 \quad (4).$$

The above relational expression (2) can be obtained by adjusting the units of the relational expression (4). Accordingly, the relational expression (2) means that the astigmatism amount SAS per unit variation amount is specified by the beam shaping magnification m independently of the thickness of the beam shaping element 2 and independently of the arrangement position of the beam shaping element 2. Accordingly, by applying this relational expression (2) to the above relational expression (1), the astigmatism that changes according to the thermal expansion and contraction of the extending portion 16 of the light source retaining holder 11 can be derived.

Efficiency [%] shown in the table of FIG. 3 is the utilization efficiency of the light beam, and the utilization efficiency increases as the beam shaping magnification m is increased to approximate the beam shape to a round one. It is necessary to ensure 20% for the utilization efficiency of the light beam in order to deliver a stable performance upon recording or reproducing at a high speed on or from the optical disc 7 or to deliver a stable recording/reproducing performance for the optical disc 7 having a multitude of recording layers. It can be understood from FIG. 3 that the beam shaping magnification m needs to be about 1.5 to this end. The efficiency ratios in the table of FIG. 3 show ratios of the respective utilization efficiencies to a reference utilization efficiency when the beam shaping magnification m is 2.3. LDPw ratios in this table show ratios of beam emission amounts at the respective beam shaping magnifications to a reference beam emission amounts when the beam shaping magnification m is 2.3.

In order to obtain a sufficient recording/reproducing performance as the optical pickup, the astigmatism needs to be suppressed to about 0.02 [$\lambda$] even upon an environmental temperature change. At this time, it is preferable to suppress the astigmatism caused in one optical component such as the beam shaping element 2 to or below about 0.01 [$\lambda$]. If the astigmatism amount is equal to or below 0.01 [$\lambda$], a high spot quality on the optical disc can be maintained and a high recording/reproducing performance can be obtained.

Here, it is assumed that the environmental temperature change ΔT changes to 50° C. (e.g. change from normal temperature of 25° C. to 75° C.) in the case of using the beam shaping element 2 with the beam shaping magnification m of 2.2. Under this condition, when the amount of astigmatic aberration ΔWA on the assumption that the distance L from the light source side surface 2a to the fixed point was 1.0 mm was calculated in cases where the distance from the emission point 1a to the light source side surface 2a of the beam shaping element 2 was 1.0 mm, 1.2 mm, 1.4 mm, 1.6 mm and 2.0 mm, a result as shown in FIG. 5 was obtained. Under this condition, the amount of astigmatic aberration ΔWA is below 9.45 [mλ], i.e. below 10 [mλ] only when the distance between the emission point 1a and the light source side surface 2a of the beam shaping element 2 is 1.0 mm.

In the case where the beam shaping magnification m of the beam shaping element 2 is 2.3, the amount of astigmatic aberration ΔWA is 10.80 [mλ], i.e. above 10 [mλ] even when the distance between the emission point 1a and the light source side surface 2a of the beam shaping element 2 is 1.0 mm as shown in FIG. 6. Thus, the distance between the laser light source 1 and the beam shaping element 2 has to be set below 1 mm. Accordingly, in the case where the beam shaping magnification m is 2.3, it is not possible to define such a clearance between the laser light source 1 and the beam shaping element 2 as to be able to correct the astigmatism caused in the other optical component.

On the other hand, in the case of ΔWA=0.01 [λ], there is a margin of L<about 2.8 mm if the beam shaping magnification m of the beam shaping element 2 is 1.9. Accordingly, by setting the beam shaping magnification m to about 1.9, the adhesion position of the adhesive 60 can have a margin. If L=1.0 mm in the case of the beam shaping magnification m of 1.9, the utilization efficiency becomes 24% as shown in FIG. 3, wherefore a sufficient utilization efficiency can be obtained while ensuring an adhesion margin. If the beam shaping magnification m is increased up to 2.3, L<1.0 mm and no adhesion margin can be ensured as described above.

Specifically, by applying the above relational expressions (1) and (2), a design value concerning the adhesion position of the beam shaping element 2 can be so calculated as to sufficiently suppress the astigmatism amount even if the environmental temperature around the optical pickup increases by 40° C. to 50° C. By restricting the distance L from the light source side surface 2a to the fixed point in accordance with the beam shaping magnification m of the beam shaping element 2, there can be obtained a significant effect of being able to construct an optical pickup having a high spot quality on the disc surface even upon an ambient temperature change.

In the optical pickup, the larger the beam shaping magnification m, the higher the utilization efficiency of the light beam emitted from the laser light source 1. Thus, the beam shaping magnification m is preferably large for the high speed recording/reproduction and the multilayer of the optical disc. If the beam shaping magnification m is large, a higher laser beam output passes through the objective lens 6 even if the laser light source 1 is driven by a constant drive current than in the case where the shaping magnification m is small. Accordingly, in order to reduce the power consumption of the optical pickup, the beam shaping magnification m is preferably large. If the utilization efficiency of the light beam increases, there is also an effect of being able to reduce the emission amount of the laser light source 1, i.e. an amount of heat generation. Further, if the beam shaping magnification m is excessively large, the astigmatism amount caused by a change in the distance from the emission point 1a to the beam shaping element 2 increases, wherefore astigmatism is more likely to occur upon an environmental change such as a temperature change.

On the contrary, if the beam shaping magnification m is small, the astigmatism amount caused by a change in the distance between the emission point 1a and the beam shaping element 2 decreases, wherefore astigmatism is more unlikely to occur upon an environmental change such as a temperature change. Further, if the shaping magnification m is small, movement sensitivity is reduced. Thus, it becomes easier to adjust the position of the beam shaping element 2 and to ensure the adhesion margin. However, the smaller the beam shaping magnification m, the lower the utilization efficiency of the light emitted from the laser light source 1. Therefore, the power consumption and the like of the optical pickup increase.

Astigmatisms generated by other optical components constituting the optical pickup due to their structures can be corrected for the correction of the total astigmatism as the optical pickup by intentionally deviating the distance between the beam shaping element 2 and the light source 1 from the design value. In such a case, if the beam shaping magnification m is small, the astigmatism amount decreases. Thus, an adjustment range of the position of the beam shaping element 2 relative to the laser light source 1 becomes larger. As a result, for example, positional inferences with the other optical components occur.

Accordingly, in order to obtain a sufficient light utilization efficiency, to suppress the astigmatism amount at the time of a temperature change and to ensure the adhesion margin, the beam shaping magnification m is preferably equal to or above 1.5 and equal to or below 2.2.

In the case where the beam shaping magnification m is about 1.9, the astigmatism amount and the light utilization efficiency are best balanced. Accordingly, if m=about 1.9, the optical pickup has advantages in all the aspects of recording/reproducing performance, running cost, designability and assemblability.

The light source retaining holder 11 is preferably made of a material having a small expansion coefficient upon a temperature change. This material is preferably a metallic material such as aluminum or zinc satisfying both easy availability and easy processability. The beam shaping element retaining holder 21 is also preferably made of a metallic material such as aluminum or zinc for the same reason.

As described above, in this embodiment, the positioning portion for the beam shaping element 2 is so specified as to satisfy the relational expressions (1) and (2). Specifically, by paying attention to differences in the astigmatism amount depending on the beam shaping magnification m, the relational expression (2) of the beam shaping magnification m and the astigmatism amount $S_{AS}$ is derived and the center position of the positioning portion is specified based on the relational expression (2). Thus, the astigmatism of the beam shaping element 2 caused by a temperature change in a working environment can be reliably kept within a permissible range. In addition, since the center position of the positioning portion can be specified in the range conforming to the beam shaping magnification m, the beam shaping magnification m can be set within a suitable range in accordance with the permissible astigmatism amount.

Further, since the light source retaining holder 11 and the element retaining holder 21 are bonded in this embodiment, they can be easily fabricated.

Furthermore, since the positioning portion is formed of the adhesive 60 bonding the light source retaining holder 11 and the beam shaping element 2, the position of the beam shaping element 2 can be easily adjusted before the adhesive 60 is cured and the beam shaping element 2 can be reliably fixed by the curing of the adhesive 60.

Although the light source retaining holder 11 and the element retaining holder 21 are bonded in this embodiment, they may be integrally molded instead. Then, the positioning accuracy of the beam shaping element 2 relative to the laser light source 1 can be further improved. In this case, instead of or in addition to fixing the beam shaping element 2 to the extending portion 16, the beam shaping element 2 can be fixed to the element retaining holder 21. In such a case, the beam shaping element 2 may be fixed to the element retaining holder 21, for example, at a contact surface thereof with the element retaining holder 21 by an adhesive or the like.

Although the adhesive 60 is used to fix the beam shaping element 2 in this embodiment, this adhesive 60 may be an ultraviolet curable resin, a thermosetting resin, an anaerobic curable resin, a moisture curable resin or the like in light of easy assemblability. The adhesive 60 may also be a volatile adhesive. The adhesive 60 is preferably an ultraviolet curable resin that is easy to cure and is unlikely to give influences such as distortion to the optical elements.

Second Embodiment

Figure 7:
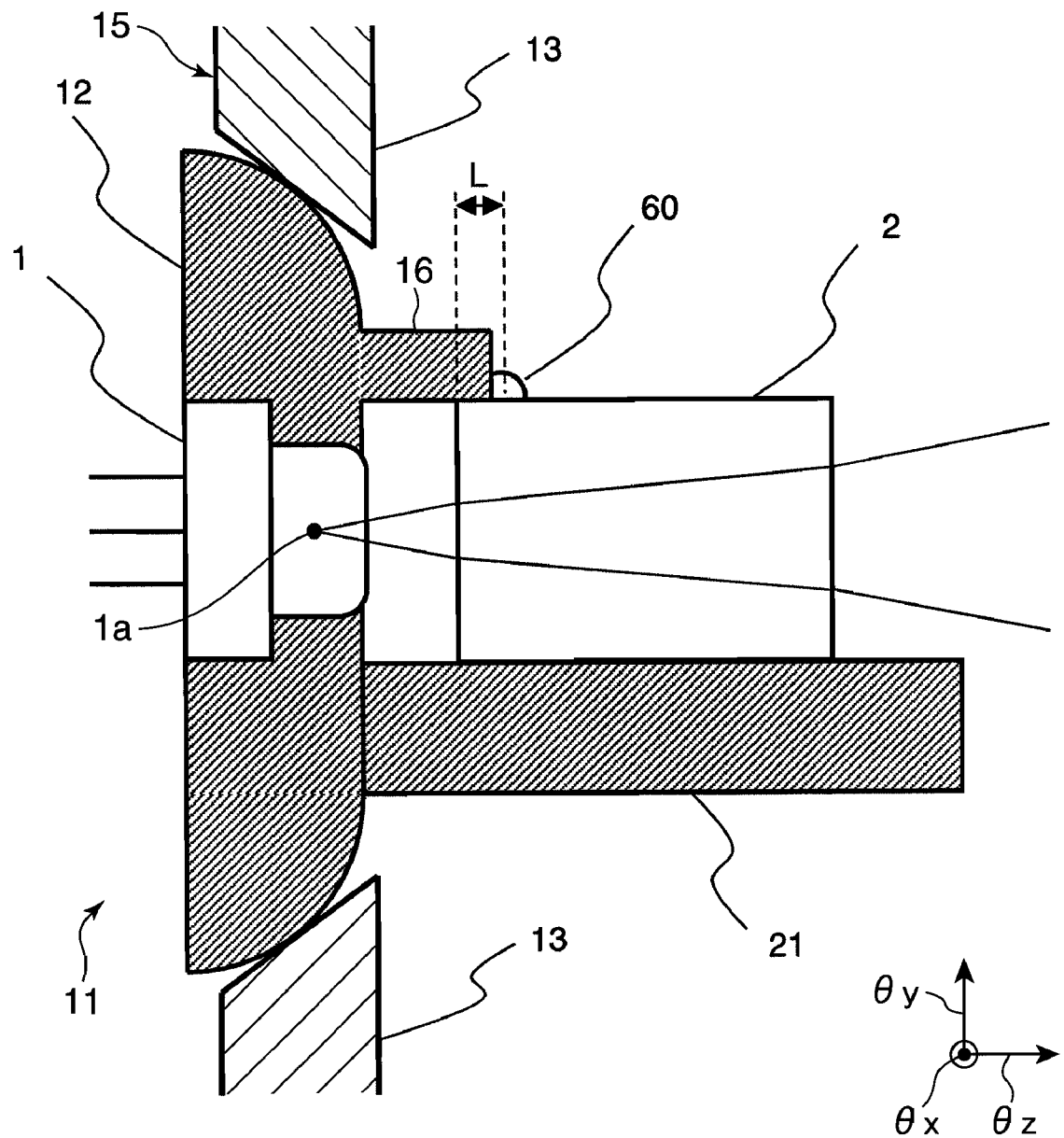
FIG. 7 is a diagram schematically and enlargedly showing a light source section of an optical pickup according to a second embodiment of the invention.

FIG. 7 schematically shows the construction of a light source section of an optical pickup according to a second embodiment of the present invention. Here, the same construction as the first embodiment is identified by the same reference numerals and is not described.

As shown in FIG. 7, a holder main body 15 of a light source retaining holder 11 includes a light source tilting holder 12 and an optical axis adjusting holder 13. An extending portion 16 is provided on the light source tilting holder 12. A beam shaping element holder 21 is fixed to the light source tilting holder 12.

A light source 1 is fixed to the light source tilting holder 12 by a method similar to that of the first embodiment. The light source tilting holder 12 is held in contact with the optical axis adjusting holder 13 and is rotatable substantially about an emission point 1a. By having such a construction, if the light source 1 is fabricated to have an emission angle, the light source tilting holder 12 can be tilted relative to the optical axis adjusting holder 13 with respect to a θx axis and a θy axis. Thus, the emission angle can be adjusted to a desired angle by tilting the light source tilting holder 12.

The optical axis adjusting holder 13 is supported on an unillustrated optical base and is freely movable in upward, downward, leftward and rightward directions in FIG. 7. By moving the optical axis adjusting holder 13 to up, down, left or right, the optical axis can be adjusted at the time of assembling the optical pickup.

Here, the relationship of a fixed position of the beam shaping element 2 with the light source 1 satisfies the relational expressions (1) and (2) shown in the first embodiment.

By having such a construction, at the time of assembling the optical pickup, the light source 1 can suppress an astigmatism amount within a permissible range even upon an environmental temperature change similar to the effect described in the first embodiment while adjusting both a deviation of the emission angle thereof and the optical axis of the optical pickup.

The light source tilting holder 12 and the element retaining holder 21 may be integrally molded. In this case, instead of or in addition to fixing the beam shaping element 2 to the extending portion 16, the beam shaping element 2 may be fixed to the element retaining holder 21. In such a case, the beam shaping element 2 may be fixed, for example, at a contact surface thereof with the element retaining holder 21 by an adhesive or the like.

All the constructions described in the first embodiment are effective and similarly provide significant effects also in the second embodiment.

Third Embodiment

A third embodiment of the present invention differs from the first and second embodiments in the adhesive 60 for fixing the beam shaping element 2 to the light source retaining holder 11, and the other constituent elements are the same as in the first and second embodiments.

The adhesive 60 in the third embodiment is an ultraviolet curable resin and has no ultraviolet absorption region for ultraviolet rays having a wavelength $\lambda$ (e.g. 405 nm as a representative value) of 390 to 420 nm. In other words, this adhesive 60 does not start its curing reaction even if light of the wavelength $\lambda$ is irradiated before the curing. Thus, the curing reaction of the adhesive 60 does not start even if the laser light source 1 is driven to emit light before the curing.

To be arranged in proximity to the light source 1 can be given as a feature of the beam shaping element 2. This feature is known to be effective in miniaturizing the optical pickup. However, as described in the first embodiment, there is a problem that astigmatism is likely to occur unless sufficient consideration is given to the position of the fixing point where the beam shaping element 2 is fixed. In order to solve this problem, the arrangement in the first or second embodiment may be adopted. However, in the case of fixing the beam shaping element 2 by the adhesive 60, a fixing location where the beam shaping element 2 is fixed is not a point, but has a specific area. In other words, the fixing point is subject to manufacturing variations relative to a design position and the performance of a product might not possibly be stable due to this influence. Therefore, a variation of an applied amount of the adhesive 60 needs to be set to or below a specific level and a position of application needs to be least subject to manufacturing variations.

Upon assembling the optical pickup, astigmatisms of other optical components such an objective lens can be corrected by adjusting the distance between the emission point 1a and the beam shaping element 2. However, if the beam shaping element 2 is fixed by applying the adhesive 60 after the position of the beam shaping element 2 is adjusted, there is the following problem. Specifically, an adjustment jig is, for example, available on an adjusting apparatus (not shown) for adjusting the position of the beam shaping element 2. Thus, there is a likelihood that this adjustment jig stands as a hindrance at the time of applying the adhesive. Further, since the light source 1 and the beam shaping element 2 are close to each other, it might be difficult to confirm the position of adhesion by the eyes. Therefore, it is difficult to apply the adhesive at an accurate position.

FIG. 8A shows a relationship of absorption intensity and wavelength before the curing of a general ultraviolet curable resin. The general ultraviolet curable resin starts its curing reaction even upon the irradiation of light having the wavelength $\lambda$ of 390 nm to 420 nm. This is for improving the curing performance of the adhesive by starting the curing reaction even in a higher wavelength region than an ultraviolet region. However, the light source 1 needs to be driven to emit light at the time of adjusting the position of the beam shaping element 2, for example, by a general method for measuring wavefront aberrations such as astigmatism. Thus, if the adhesive made of the general ultraviolet curable resin is applied before the position adjustment of the beam shaping element 2, the curing reaction starts when the light source 1 is driven to emit light since the beam shaping element 2 is arranged in proximity to the light source 1. This leads to a problem that the beam shaping element 2 is fixed before the position adjustment is completed.

On the contrary, the adhesive 60 in the third embodiment does not start the curing reaction in the wavelength region of light beams emitted from the laser light source 1. The absorption intensity of the resin used for the adhesive 60 before the curing is shown in FIG. 8B.

Since the adhesive 60 does not start the curing reaction even upon the irradiation of light having the wavelength λ of 390 to 420 nm in the third embodiment, the adhesive 60 can be applied before the optical pickup being assembled is placed on the adjusting apparatus for adjusting the position of the beam shaping element 2. Thus, the adjustment jig on the adjusting apparatus does not stand as a hindrance upon applying the adhesive 60 and, if it is difficult to confirm the position of adhesion by the eyes, the position of adhesion can be confirmed using a magnifying glass such as a microscope. Since it is easy to confirm the location of adhesion by the eyes, the applied amount of the adhesive 60 can be sufficiently controlled.

The position of the beam shaping element 2 is adjusted in the following procedure. First, the beam shaping element 2 is placed on the element retaining holder 21 to temporarily position the beam shaping element 2. In this state, the adhesive 60 is applied to the adhesion surfaces of the beam shaping element 2 and the extending portion 16. The adhesive 60 can be applied before the optical pickup is placed on the adjusting apparatus, and the optical pickup is placed on the adjusting apparatus after the adhesive 60 is applied.

Then, the laser light source 1 is driven to emit light to adjust the position of the beam shaping element 2 while aberrations are measured by an unillustrated aberration measuring device. At this time, the light beam may be incident on the adhesive 60, but the adhesive 60 does not start the curing reaction. After the position adjustment of the beam shaping element 2, the adhesive 60 can be cured by being irradiated with ultraviolet rays. In this way, the beam shaping element 2 can be fixed at an accurate position having less manufacturing variations and approximate to the design value. In addition, the completely assembled optical pickup has an effect of being able to suppress the astigmatism within a permissible range even if ambient temperature changes in a working environment.

As described above, in the third embodiment, there is no likelihood that the beam shaping element 2 is fixed upon driving the laser light source 1 to emit light since the adhesive 60 does not start the curing reaction in response to the light beam emitted from the laser light source 1. Therefore, the position of the beam shaping element 2 can be adjusted by driving the laser light source 1 to emit light.

Further, since the adhesive 60 is already applied at the time of adjusting the position of the beam shaping element 2, it is not necessary to apply the adhesive 60 after the positioning of the beam shaping element 2 is finished. Thus, there is no likelihood of an astigmatism change by sensitively reacting to pressure when the adhesive 60 is applied, wherefore the astigmatism caused by the beam shaping element 2 can be easily set within a proper range.

Although the adhesive 60 that does not start the curing reaction in the above wavelength region is used to fix the beam shaping element 2 in the third embodiment, the use thereof is not limited to this application. Specifically, the adhesive 60 can be used to fix any optical element or constituent part in the optical pickup at a certain position, which element or part needs to have the position thereof adjusted while being exposed to the irradiation of the light beam having the wavelength λ and emitted from the laser light source 1. In this case as well, since the adhesive 60 does not start the curing reaction during the irradiation of the light having the wavelength λ, the targeted object can be fixed using ultraviolet rays after the sufficient position adjustment. In other words, the adhesive 60 is the one for bonding optical components provided in the optical pickup to fixing portions and is made of an ultraviolet curable resin that does not start the curing reaction in the wavelength region of the light beam emitted from the light source.

Even if such an adhesive 60 is used, the same effects as those described in the first and second embodiments can be obtained.

Fourth Embodiment

Figure 9A:
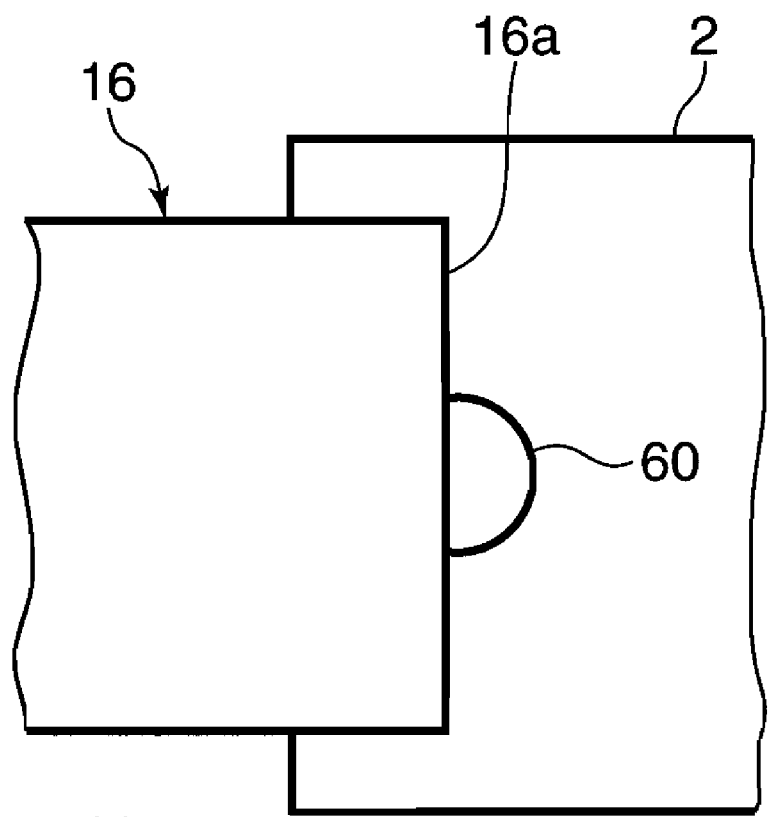
FIGS. 9A and 9B are diagrams showing an adhesion portion of the beam shaping element used in the optical pickup according to the first embodiment of the invention.
Figure 9B:
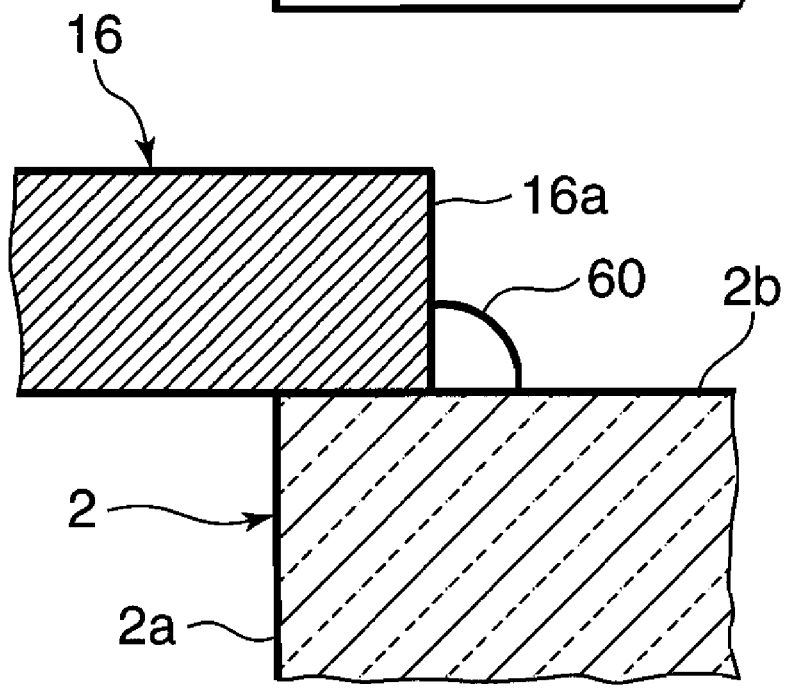
Figure 10A:
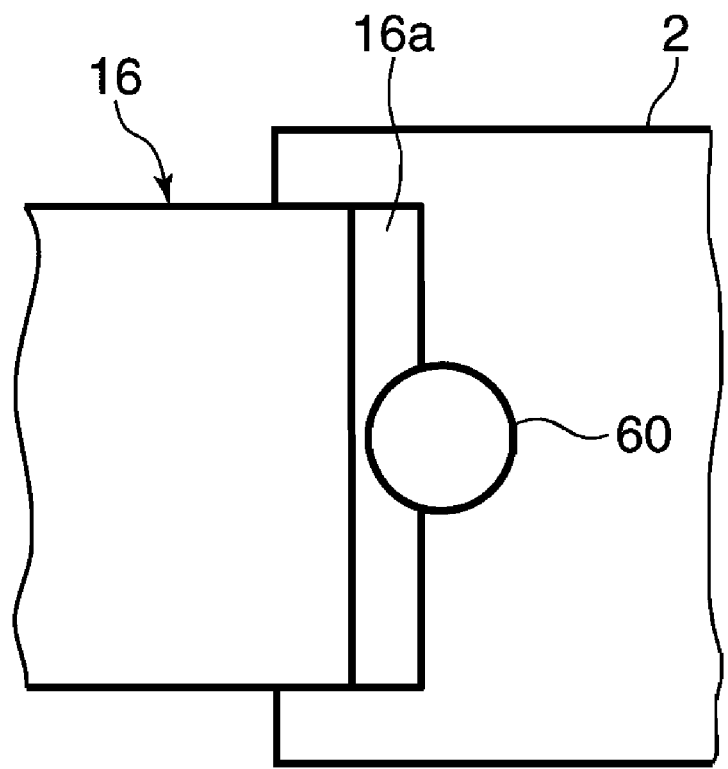
FIGS. 10A and 10B are diagrams showing a modification of the adhesion portion of the beam shaping element used in the optical pickup according to the first embodiment of the invention.
Figure 10B:
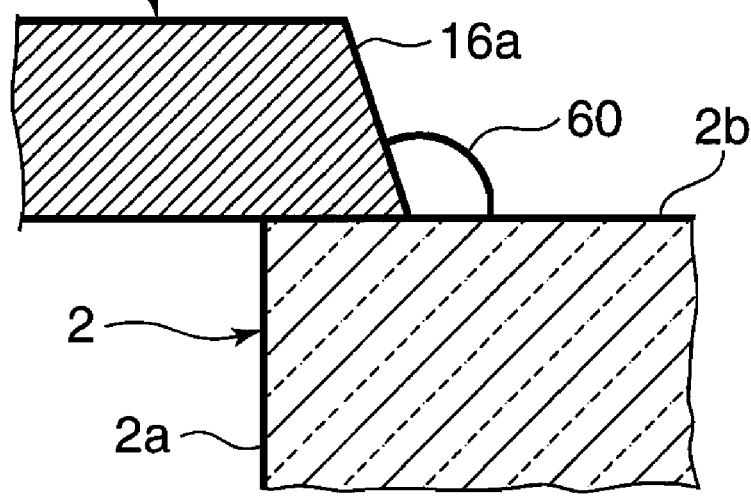

In the first embodiment, the adhesive 60 is applied to a leading end surface 16a of the extending portion 16 as shown in FIGS. 9A and 9B. The leading end surface 16a of the extending portion 16 is a flat surface perpendicular to a side surface (circumferential surface) 2b (upper surface in FIG. 9B) of the beam shaping element 2, and the adhesive 60 is applied to cross over the leading end surface 16a of the extending portion 16 and the side surface 2b of the beam shaping element 2. The leading end surface 16a of the extending portion 16 may be inclined with respect to the side surface 2b of the beam shaping element 2 as shown in FIGS. 10A and 10B.

Figure 11A:
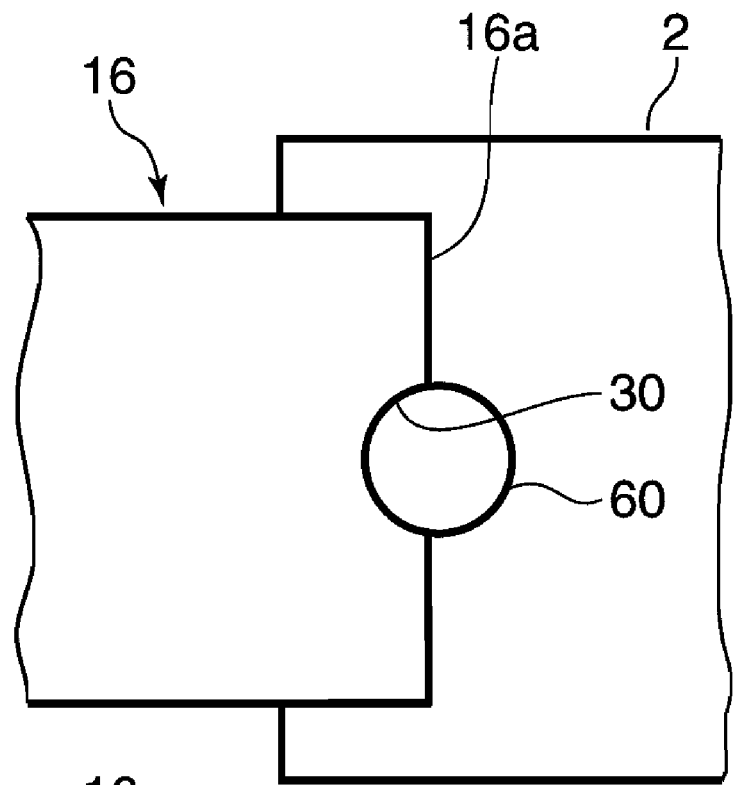
FIGS. 11A and 11B are diagrams showing an adhesion portion of the beam shaping element used in the optical pickup according to the fourth embodiment of the invention.
Figure 11B:
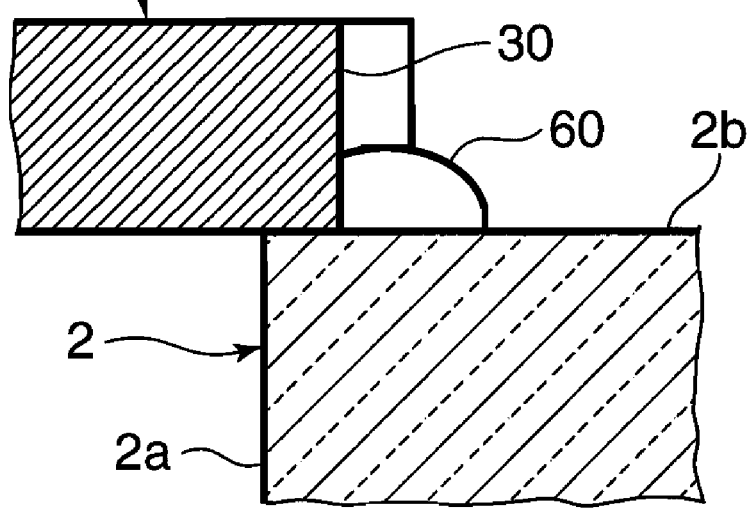
Figure 12A:
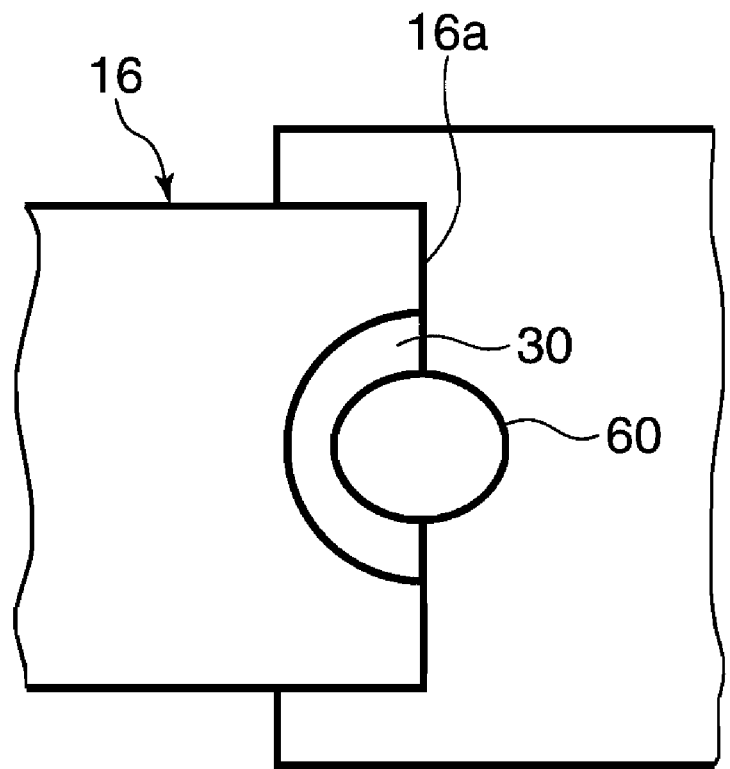
FIGS. 12A and 12B are diagrams showing a modification of the adhesion portion of the beam shaping element used in the optical pickup according to the fourth embodiment of the invention.
Figure 12B:
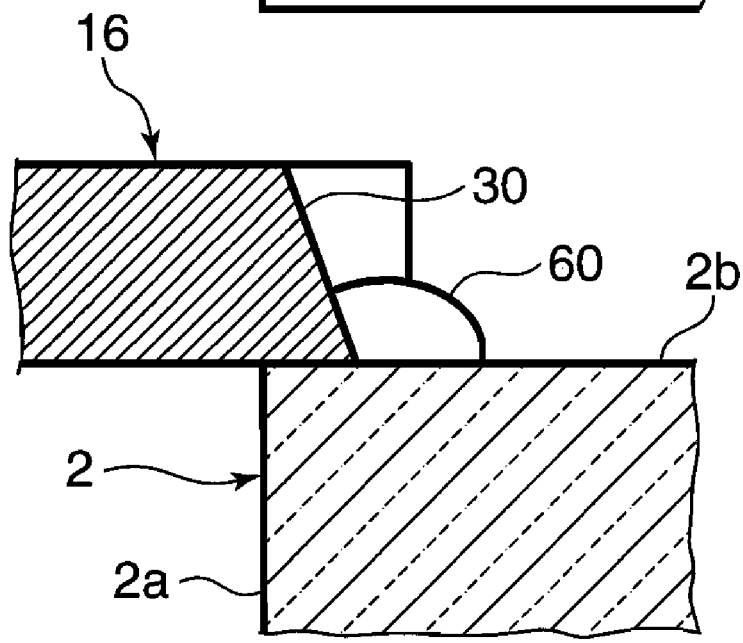

On the contrary, in a fourth embodiment, a restricting portion 30 for restricting the arrangement position of the adhesive 60 is provided on the leading end surface 16a of the extending portion 16 as shown in FIGS. 11A and 11B. This restricting portion 30 is a recessed portion having a substantially semicircular cross section, and is formed on the leading end surface 16a from the upper surface to the lower surface of the extending portion 16. The restricting portion 30 may be formed to have a constant cross-sectional area in a vertical direction, i.e. in a direction normal to an optical axis direction as shown in FIGS. 11A and 11B. Alternatively, the restricting portion 30 may be so tapered as to have different cross-sectional areas at upper and lower sides as shown in FIGS. 12A and 12B.

If the arrangement position of the adhesive 60 is restricted by the restricting portion 30 in the form of a recessed portion in this way, an application area of the adhesive 60 can be easily controlled. As a result, the center position of the adhesive 60 can be accurately controlled. Further, in the case where the restricting portion 30 is in the form of a recessed portion, the extending length of the extending portion 16 can be shortened as compared to the case where the restricting portion 30 is in the form of a hole as described later. Therefore, the interference of the extending portion 16 with surrounding other members can be more easily prevented, which is effective in miniaturizing the optical pickup.

Figure 13A:
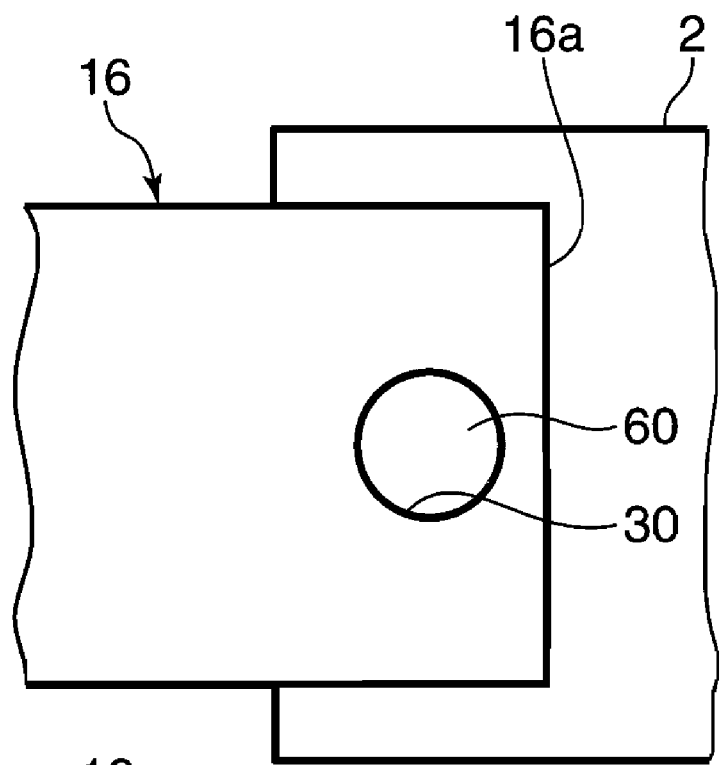
FIGS. 13A and 13B are diagrams showing another modification of the adhesion portion of the beam shaping element used in the optical pickup according to the fourth embodiment of the invention.
Figure 13B:
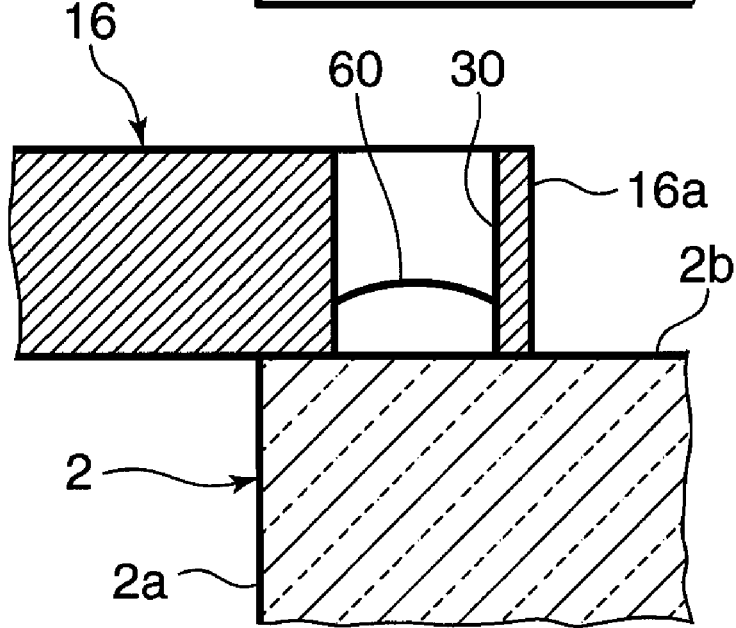

The shape of the restricting portion 30 is not limited to the recessed shape. For example, as shown in FIGS. 13A and 13B, the restricting portion 30 may be a through hole vertically penetrating the extending portion 16. If the restricting portion 30 is in the form of a through hole, an adhesion area by the adhesive 60 can be reliably restricted.

Figure 14A:
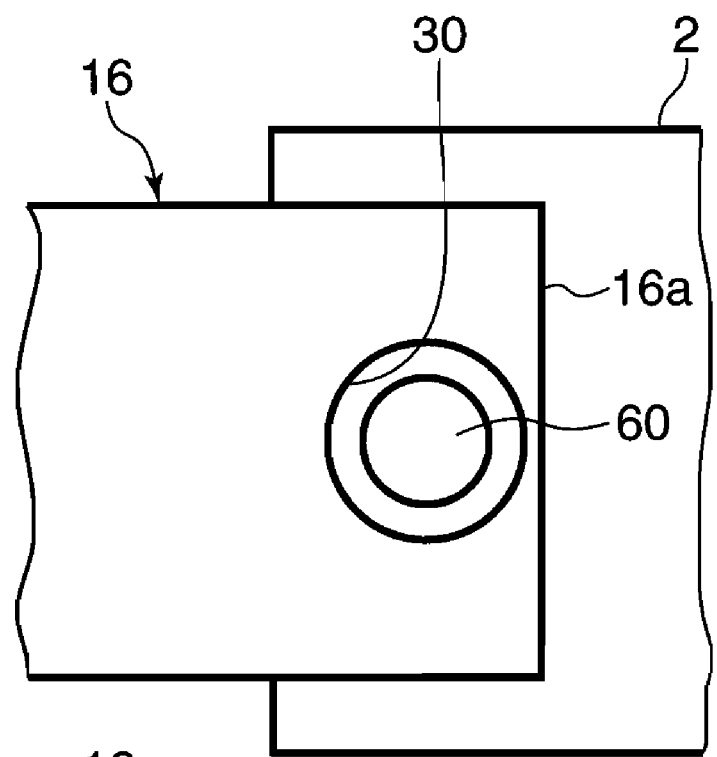
FIGS. 14A and 14B are diagrams showing another modification of the adhesion portion of the beam shaping element used in the optical pickup according to the fourth embodiment of the invention.
Figure 14B:
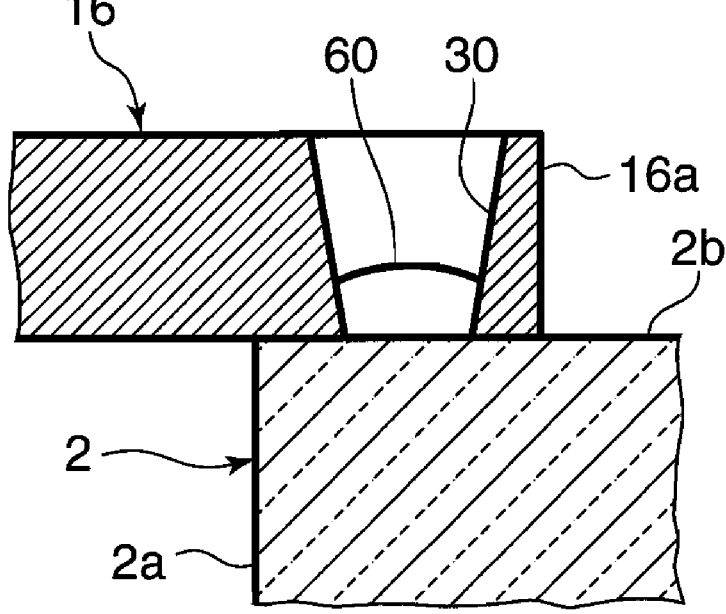

The through hole is not limited to the one having a constant cross-sectional area in a penetrating direction, and may be a tapered hole having different cross-sectional areas at upper and lower sides as shown in FIGS. 14A and 14B. In this case, the tapered through hole is preferably such that the diameter thereof is larger at a side where the adhesive 60 is to be poured.

Fifth Embodiment

Figure 15:
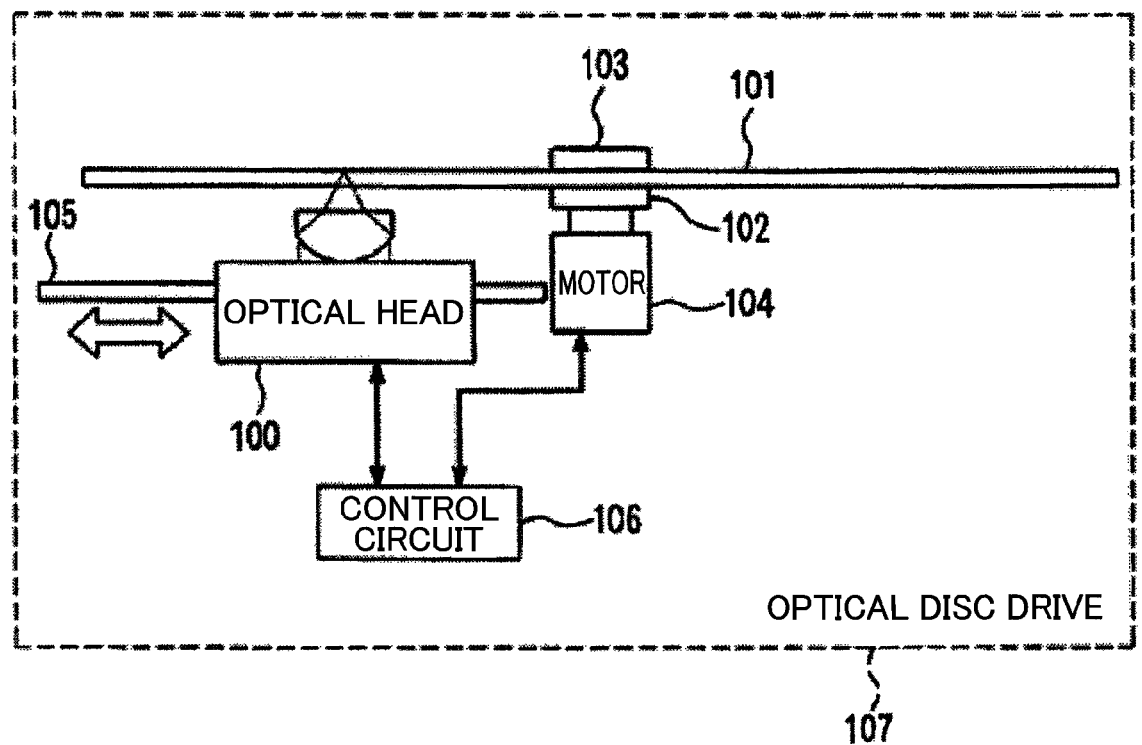
FIG. 15 is a diagram schematically showing the construction of an optical information apparatus, to which the optical pickup of the invention is applied.

FIG. 15 schematically shows an optical information apparatus, to which the optical pickup described in the first embodiment of the present invention is applied. It should be noted that any one of the optical pickups of the second to fourth embodiments may be applied instead of applying the optical pickup described in the first embodiment.

FIG. 15 schematically shows an optical disc drive 107 constructed as an optical information recording/reproducing apparatus. An optical disc 101 is fixed while being held between a turntable 102 and a damper 103, and is rotated by a motor (rotating system) 104.

The above optical pickup is mounted on an optical head 100. The optical pickup of the optical head 100 is provided on a traverse (conveyance system) 105, so that an irradiated light can move from the inner circumference to the outer circumference of the optical disc 101. A control circuit 106 executes a focus control, a tracking control, a traverse control, a rotation control of the motor 104 and the like in accordance with a signal received from the optical head 100, reproduces information from a reproduction signal and sends a recording signal to the optical head 100.

Sixth Embodiment

Figure 16:
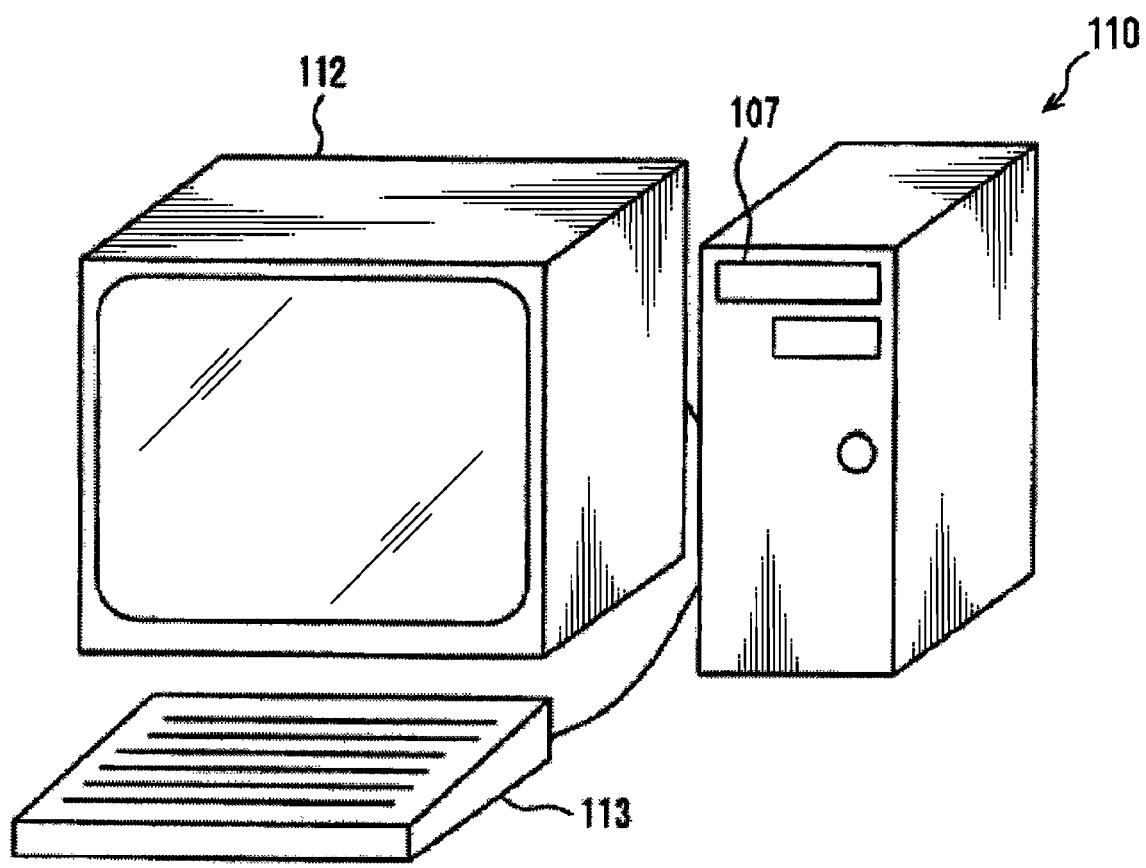
FIG. 16 is a schematic perspective view showing the external appearance of a computer, to which the optical pickup of the invention is applied.

Examples of optical information equipments comprising an optical disk apparatus and an Arithmetic unit are described in the sixth embodiment to tenth embodiment. FIG. 16 shows the external appearance of a computer (personal computer) equipped with the optical disc drive(optical information recording/reproducing apparatus) shown as the fifth embodiment of the present invention.

This personal computer 110 includes the optical disc drive 107 described in the fifth embodiment, a keyboard 113 as an input device for inputting information and a monitor 112 as an output device for displaying information.

The computer 110 equipped with the optical disc drive 107 of the above fifth embodiment as an external storage device is capable of stably recording or reproducing information on or from different types of optical discs and is widely applicable. The optical disc drive 107 can be used as a backup device for a hard disk in the computer 110, taking advantage of its large capacity. The optical disc drive 107 enables programs and data to be exchanged between people and to be carried around for the user's own purpose, taking advantage of media (optical discs) being inexpensive and easily portable and having such compatibility as to have information read by other optical disc drives. Further, it can also deal with the reproduction/recording of existing media such as DVDs and CDs.

Seventh Embodiment

Figure 17:
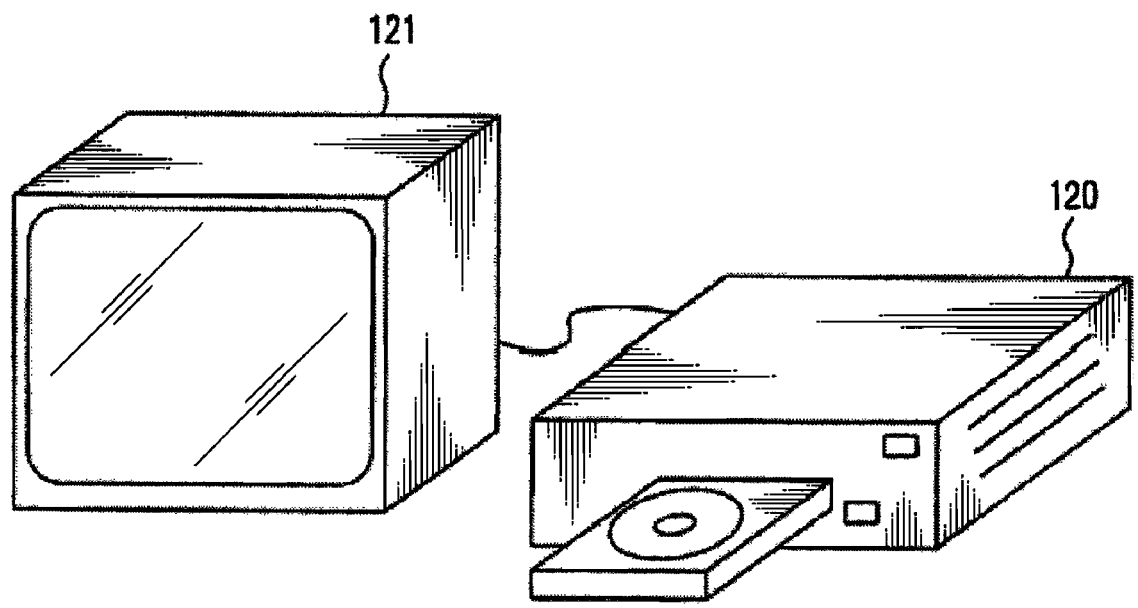
FIG. 17 is a schematic perspective view showing the external appearance of an optical disc recorder, to which the optical pickup of the invention is applied.

FIG. 17 shows the external appearance of an optical disc recorder (video recording/reproducing apparatus) equipped with the optical disc drive 107 shown as the fifth embodiment of the present invention. It should be noted that the optical disc drive 107 is not shown in FIG. 17.

The optical disc recorder 120 is internally provided with the optical disc drive 107, and is used by being connected to a monitor 121 as an output device for displaying videos.

The optical disc recorder 120 equipped with the optical disc drive 107 is capable of stably recording or reproducing videos on or from different types of optical discs and is widely applicable. The optical disc recorder 120 is capable of recording videos on media (optical discs) and reproducing them at any desired time. Optical discs do not require a rewinding operation after the recording or reproduction unlike tapes and is capable of time slip playback for reproducing the heading part of a broadcasting program while recording this broadcasting program and simultaneous recording and reproduction for reproducing a previously recorded broadcasting program while recording another broadcasting program. Further, taking advantage of the media being inexpensive and easily portable and having such compatibility as to have information read by other optical disc recorders, recorded videos can be exchanged between people and can be carried around for the user's own purpose. Further, the optical disc recorder 120 can also deal with the reproduction/recording of existing media such as DVDs and CDs.

Although the optical disc recorder 120 is equipped with the optical disc drive 107 here, a hard disk may be built therein and a function of recording and reproducing video tapes may be built therein. In such a case, it becomes possible to easily temporarily save and back up videos.

Eighth Embodiment

Figure 18:
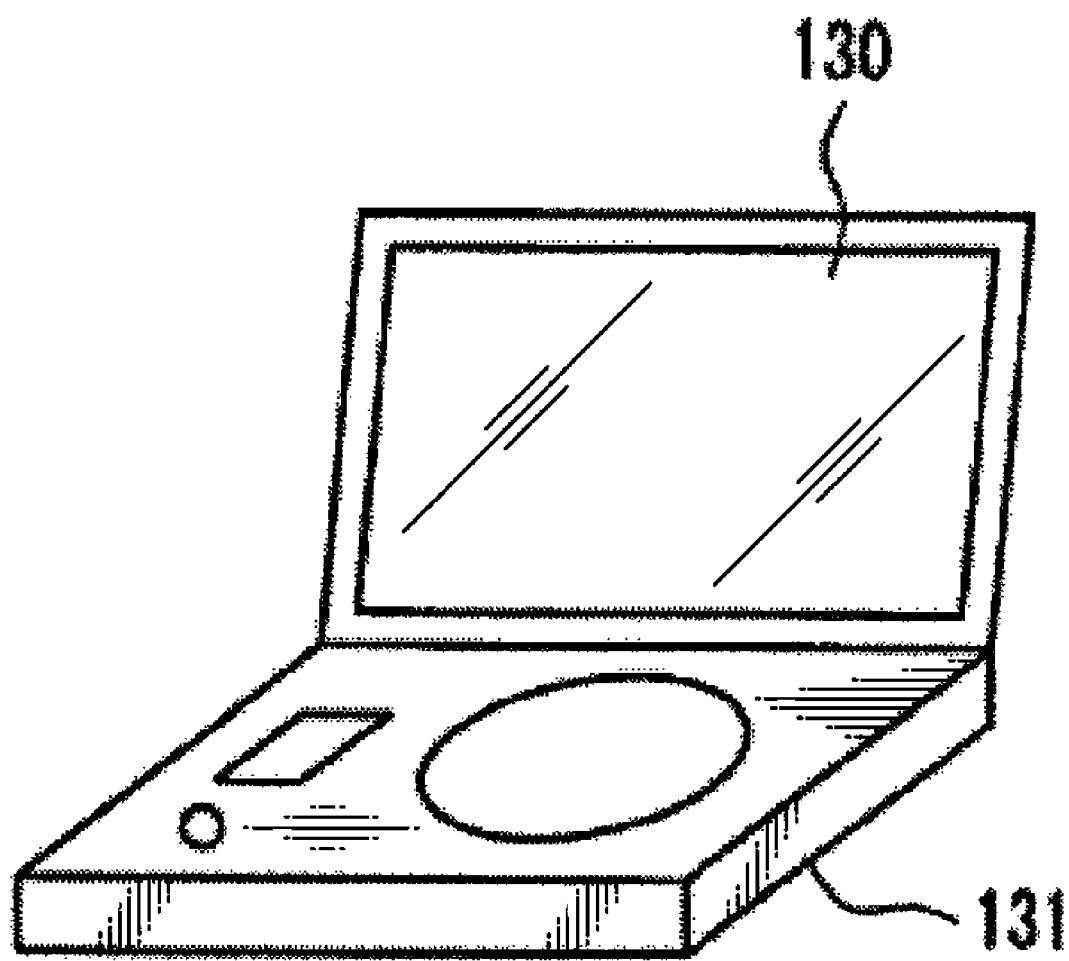
FIG. 18 is a schematic perspective view showing the external appearance of an optical disc player, to which the optical pickup of the invention is applied.

FIG. 18 shows the external appearance of an optical disc player (video reproducing apparatus) equipped with the optical disc drive 107 shown as the fifth embodiment of the present invention.

An optical disc player 131 includes a liquid crystal monitor 130 as an output device, is internally provided with the optical disc drive 107 (not shown) and can display videos recorded on an optical disc on the liquid crystal monitor 130. The optical disc player equipped with this optical disc drive 107 is capable of stably reproducing videos from different types of optical discs and is widely applicable.

The optical disc player 131 is capable of reproducing videos recorded on media (optical discs) at any desired time. Optical discs do not require a rewinding operation after the recording or reproduction unlike tapes, and the optical disc player 131 can reproduce videos by accessing to any desired location of a certain optical disc and can also deal with reproduction from existing media such as DVDs and CDs.

Ninth Embodiment

Figure 19:
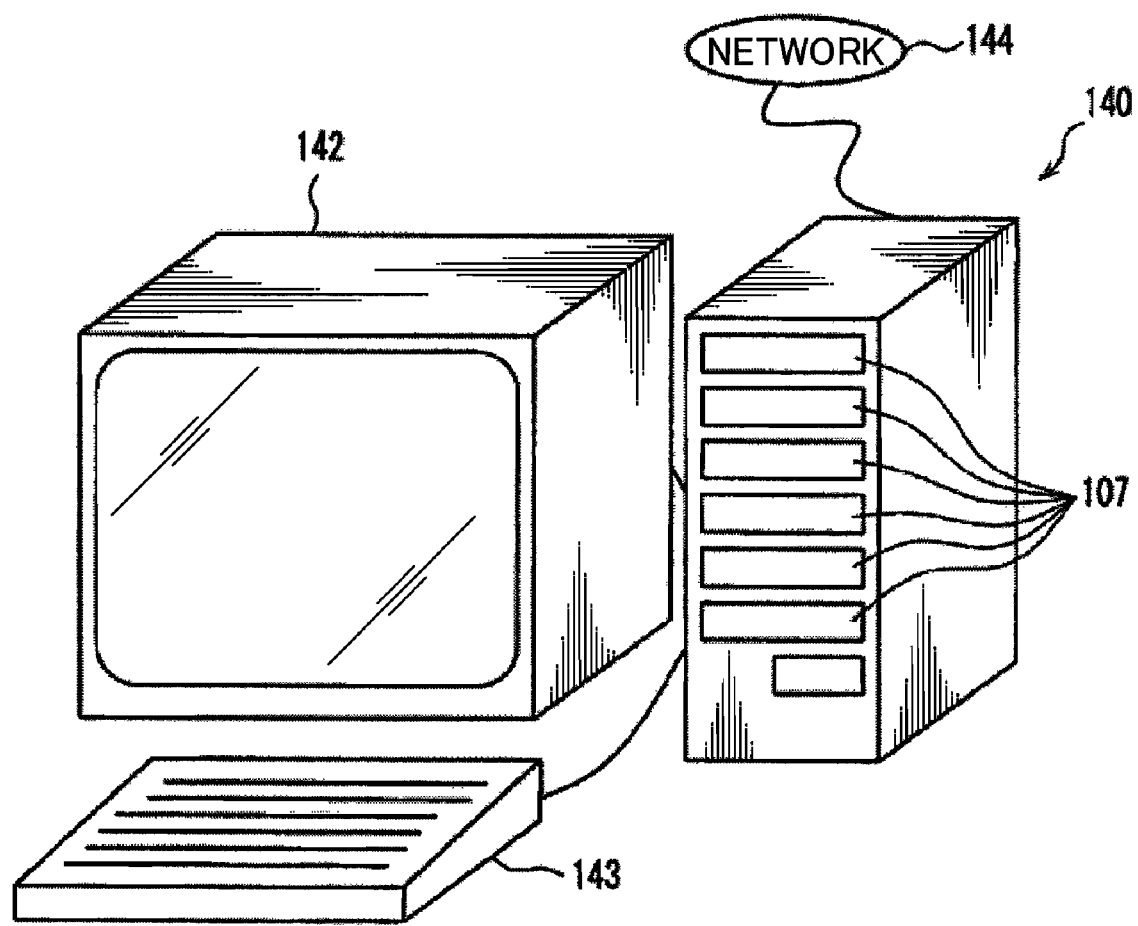
FIG. 19 is a schematic perspective view showing the external appearance of an optical disc server, to which the optical pickup of the invention is applied.

FIG. 19 is showing the external appearance of a server equipped with the optical disc drive 107 shown as the fifth embodiment of the present invention.

This server 140 includes the optical disc drive 107, a monitor 142 as an output device for displaying information and a keyboard 143 as an input device for inputting information and is connectable to a network 144.

The server 140 equipped with the optical disc drive 107 as an external storage device is capable of stably recording or reproducing information on or from different types of optical discs and is widely applicable. Taking advantage of its large capacity, the optical disc drive 107 sends information (images, sounds, videos, HTML documents, text documents and other information) recorded on an optical disc in response to a request from the network 144. The optical disk drive 107 also records information sent from the network 144 in a requested location. Since the optical disc drive 107 can also reproduce information recorded on existing media such as DVDs and CDs, it can send these pieces of information.

Tenth Embodiment

Figure 20:
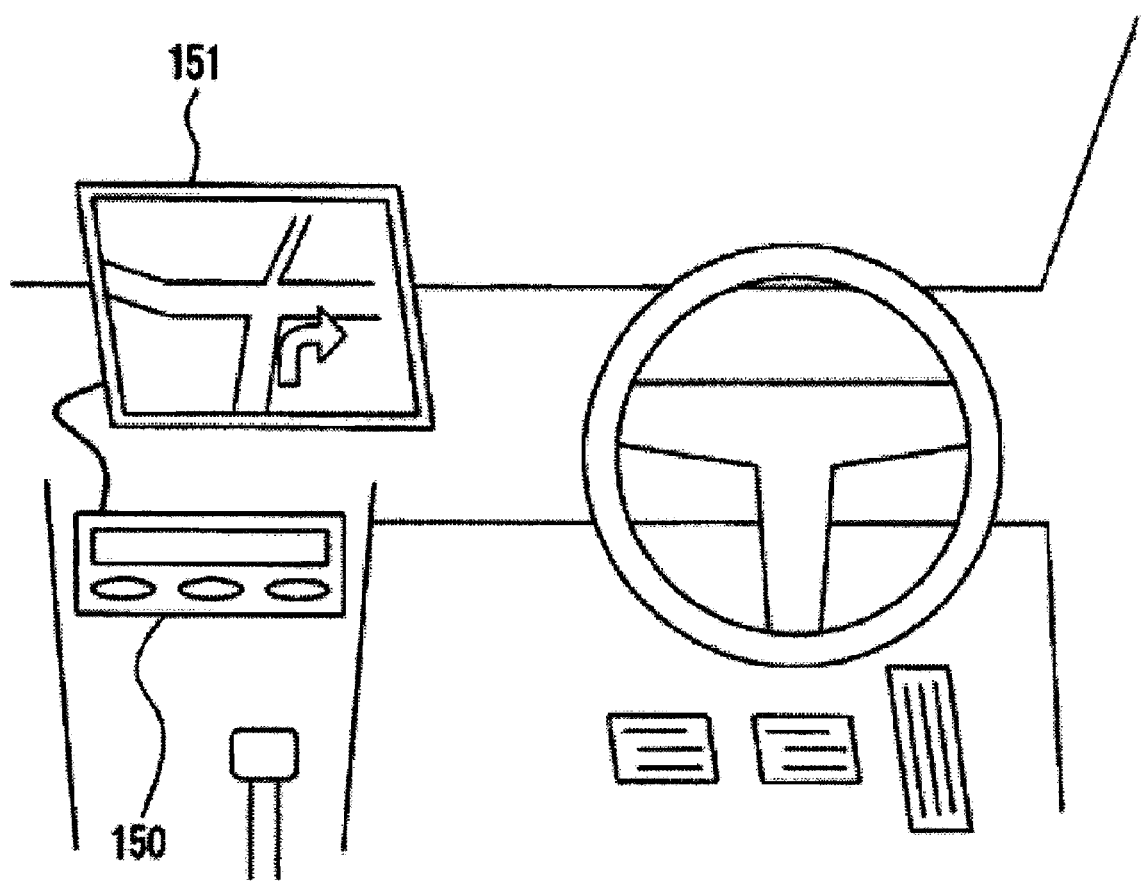
FIG. 20 is a schematic diagram showing the external appearance of a car navigation system, to which the optical pickup of the invention is applied.
Figure 21A:
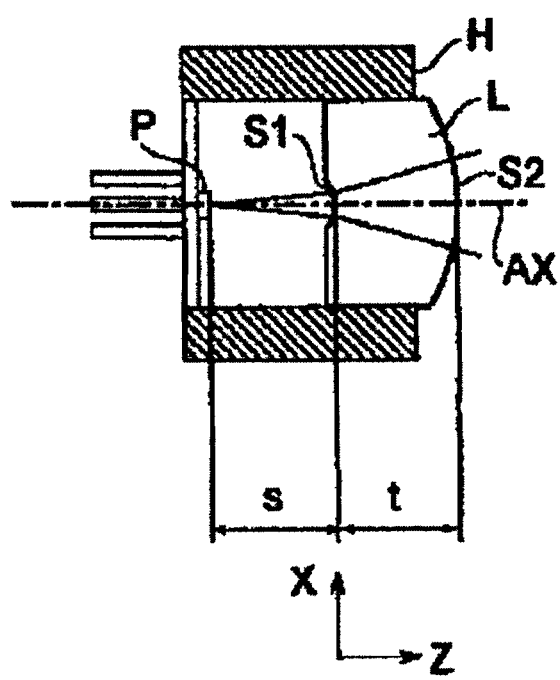
FIGS. 21A and 21B are diagrams showing a structure for retaining a beam shaping element in a conventional optical pickup.
Figure 21B:
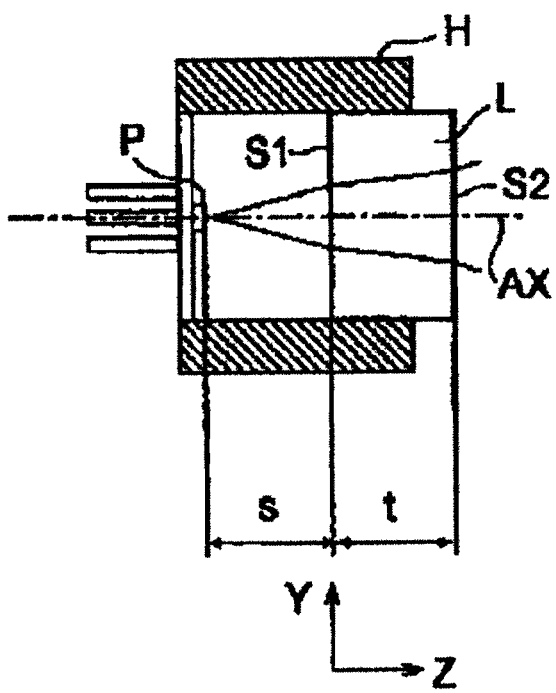

FIG. 20 shows a car navigation system equipped with the optical disc drive 107 shown as the fifth embodiment of the present invention.

A car navigation system 150 is internally provided with the optical disc drive 107 (not shown) and is used by being connected to a liquid crystal monitor 151 as an output device for displaying geographic and destination information.

The car navigation system 150 equipped with this optical disc drive 107 is capable of stably recording or reproducing videos on or from different types of optical discs and is widely applicable. The car navigation system 150 finds out a present position based on map information recorded on a medium (optical disc) and information obtained from a global positioning system (GPS), a gyroscope, a speed meter, an odometer and the like, and displays this position on the liquid crystal monitor 151. Further, if a destination is inputted, the car navigation system 150 finds out an optimal route to the destination based on the map information and street information and displays it on the liquid crystal monitor 151.

By using a large-capacity optical disc to record the map information, detailed street information covering a wide area can be provided by a single disc. Further, information on restaurants, convenience stores, gas stations and the like along streets can be simultaneously provided by being stored in the optical disc. As time passes, the street information becomes old and does not correspond to reality. However, since the optical disc has compatibility and is inexpensive, latest information can be obtained by replacing the optical disc with a new one storing new street information. Since the car navigation system 150 can also deal with the reproduction/recording of existing media such as DVDs and CDs, it is also possible to watch movies and to listen to music in automotive vehicles.

SUMMARY OF THE EMBODIMENTS OF THE INVENTION

Here, the summary of the embodiments of the present invention is described.

In the optical pickup according the embodiments to the present invention, the positioning portion of the beam shaping element is so specified as to satisfy the relational expressions (1) and (2). Specifically, by paying attention to the fact that the astigmatism amount differs depending on the beam shaping magnification m, the relational expression (2) of the beam shaping magnification m and the astigmatism amount SAS per unit variation amount is derived, and the center position of the positioning portion is specified based on the derived relational expression (2). Thus, the astigmatism of the beam shaping element caused by a temperature change in a working environment can be reliably kept within the permissible range. Further, since the center position of the positioning portion is specified within the range conforming to the beam shaping magnification m, the beam shaping magnification m can be set within a suitable range in accordance with the permissible astigmatism amount.

Here, the beam shaping magnification m of the beam shaping element is preferably 1.5 or larger and 2.2 or smaller. In this mode, since the beam shaping magnification m is 1.5 or larger, the utilization efficiency of the light beam increases and the optical pickup can be suitably used for high speed recording and optical information recording media having a multitude of recording layers. Further, since the beam shaping magnification m is 2.2 or smaller, the astigmatism amount caused by the beam shaping element can be kept within the permissible range while a sufficient spacing is ensured between the light source and the beam shaping element.

The beam shaping magnification m of the beam shaping element is more preferably about 1.9. In this mode, the beam shaping element can be stably fixed while the utilization efficiency of the light beam is ensured to be sufficient. For example, in the case of fixing the beam shaping element, for example, by an adhesive, a sufficient adhesion margin can be ensured.

The above optical pickup preferably comprises a light source retainer for retaining the light source; and a beam shaping element retainer for retaining the beam shaping element.

The light source retainer and the beam shaping element retainer may be bonded. In this mode, the light source retainer and the beam shaping element retainer can be easily fabricated.

On the other hand, the light source retainer and the beam shaping element retainer may be integrally formed. In this mode, the positioning accuracy of the beam shaping element relative to the light source can be further improved.

The positioning portion is preferably an adhesive bonding the light source retainer and the beam shaping element. In this mode, the position of the beam shaping element can be easily adjusted before the adhesion is cured, and the beam shaping element can be reliably fixed by the curing of the adhesive.

The light source retainer may include a retainer main body for retaining the light source and an extending portion extending from the retainer main body in an optical axis direction of the light beam; the positioning portion may be made of an adhesive bonding the extending portion and the beam shaping element; and the extending portion may include a restricting portion for restricting an arrangement position of the adhesive by having the shape of a recess or a hole. In this mode, since the arrangement position of the adhesive is restricted by the restricting portion in the form of a recess or a hole, an application area of the adhesive can be easily controlled. As a result, the center position of the positioning portion made of the adhesive can be accurately controlled.

The adhesive may be made of an ultraviolet curable resin that does not start a curing reaction in a wavelength region of a light beam emitted from the light source. In this mode, since the adhesive does not start the curing reaction in response to the light beam emitted from the light source, there is no likelihood that the beam shaping element is fixed upon driving the light source to emit light. Therefore, the position of the beam shaping element can be adjusted by driving the light source to emit light.

The present invention is also directed to an adjustment method used upon positioning the beam shaping element provided in the above optical pickup, the method comprising the steps of temporarily positioning the beam shaping element by a light source retainer and a beam shaping element retainer, applying an adhesive for bonding the light source retainer and the beam shaping element; driving a light source to emit light, thereby enabling the beam shaping element to be positioned; and irradiating ultraviolet rays to cure the adhesive after the beam shaping element is positioned.

In the present invention, the position of the beam shaping element can be adjusted by driving the light source to emit light. Further, since the adhesive is already applied when the position of the beam shaping element is adjusted, the adhesive needs not be applied after the positioning of the beam shaping element is finished. Thus, there is no likelihood of an astigmatism change by sensitively reacting to pressure when the adhesive is applied, wherefore the astigmatism caused by the beam shaping element can be easily set within a proper range.

The present invention is also directed to an optical information apparatus comprising the above optical pickup; a motor for rotating an optical information medium; and an electric circuit for receiving a signal obtained from an optical head device including the optical pickup and controlling and driving the motor, an optical lens and a laser light source in accordance with the signal.

The present invention is further directed to a computer comprising the above optical information apparatus, an input device or input terminal for inputting information; an arithmetic unit for carrying out an operation based on information inputted from the input device or input terminal and information reproduced by the optical information apparatus; and an output device or output terminal for displaying or outputting information inputted from the input device or input terminal, information reproduced by the optical information apparatus and an operation result by the arithmetic unit.

The present invention is furthermore directed to an optical information medium player, comprising the above optical information apparatus; and a decoder for converting an information signal obtained from the optical information apparatus into an image.

The present invention is also directed to a car navigation system, comprising the above optical information apparatus; and a decoder for converting an information signal obtained from the optical information apparatus into an image.

The present invention is further directed to an optical information medium recorder, comprising the above optical information apparatus; and an encoder for converting image information into information to be recorded by the optical information apparatus.

The present invention is furthermore directed to an optical disc server, comprising the above optical information apparatus; and input and output terminals used to exchange information with the outside.

The present invention is also directed to a beam shaping element used in an optical pickup, characterized by having a beam shaping magnification equal to or larger than 1.5 and equal to or smaller than 2.2 for shaping an incident elliptical light beam.

INDUSTRIAL APPLICABILITY

The present invention is applicable to optical pickups used in optical information apparatuses and the like.

What is claimed is:

1. An optical pickup, comprising:
   a light source;
   a beam shaping element for shaping an elliptical light beam emitted from the light source into a substantially circular light beam;
   an element for condensing the light beam shaped by the beam shaping element onto an optical information recording medium;
   a detector for detecting the light beam reflected by the optical information recording medium;
   a positioning portion for positioning the beam shaping element relative to the light source,
   wherein if it is assumed that m is a beam shaping magnification of the beam shaping element, L[mm] is a distance from a light source side surface of the beam shaping element to a center position of the positioning portion, $\alpha[1/K]$ is a coefficient of linear expansion of the retaining holder, $\Delta WA[m\lambda]$ is amount of astigmatic aberration caused by the beam shaping element and $\Delta T[K]$ is an environmental temperature variation amount, the positioning portion positions the beam shaping element in such a manner as to satisfy the following relational expressions (1) and (2):

$$0 < L \leq \Delta WA/(\alpha \cdot \Delta T \cdot S_{AS}) \quad (1)$$

$$S_{AS} = 1000(0.5\ m^2 + 1.5\ m - 2)[m\lambda/mm] \quad (2).$$

2. An optical pickup according to claim 1, wherein the beam shaping magnification m of the beam shaping element is equal to or larger than 1.5 and equal to or smaller than 2.2.

3. An optical pickup according to claim 2, wherein the beam shaping magnification m of the beam shaping element is about 1.9.

4. An optical pickup according to claim 1, further comprising a light source retainer for retaining the light source; and a beam shaping element retainer for retaining the beam shaping element.

5. An optical pickup according to claim 4, wherein the light source retainer and the beam shaping element retainer are bonded.

6. An optical pickup according to claim 4, wherein the light source retainer and the beam shaping element retainer are integrally formed.

7. An optical pickup according to claim 4, wherein the positioning portion is an adhesive bonding the light source retainer and the beam shaping element.

8. An optical pickup according to claim 4, wherein:
   the light source retainer includes a retainer main body for retaining the light source and an extending portion extending from the retainer main body in an optical axis direction of the light beam;
   the positioning portion is made of an adhesive bonding the extending portion and the beam shaping element; and
   the extending portion includes a restricting portion for restricting an arrangement position of the adhesive by having the shape of a recess or a hole.

9. An optical pickup according to claim 7, wherein the adhesive is made of an ultraviolet curable resin that does not start a curing reaction in a wavelength region of a light beam emitted from the light source.

10. An adjustment method used to position a beam shaping element provided in an optical pickup according to claim 9, comprising the steps of:
    temporarily positioning the beam shaping element by a light source retainer and a beam shaping element retainer;
    applying an adhesive for bonding the light source retainer and the beam shaping element;
    driving a light source to emit light, thereby enabling the beam shaping element to be positioned; and
    irradiating ultraviolet rays to cure the adhesive after the beam shaping element is positioned.

11. An optical disk apparatus, comprising:
    an optical pickup according to claim 1;
    a motor for rotating an optical information medium; and
    a controller for controlling the optical pickup and controlling and driving the motor.

12. An optical information equipment, comprising: an optical disk apparatus according to claim 11; and an arithmetic unit for carrying out an operation based on information reproduced by the optical disk apparatus.

* * * * *